US012650852B2

(12) United States Patent
Casella et al.

(10) Patent No.: US 12,650,852 B2
(45) Date of Patent: Jun. 9, 2026

(54) HARDWARE-TYPE-BASED MULTI-COMPONENT PERSONALITY CONFIGURATION SYSTEM

(71) Applicant: Dell Products L.P., Round Rock, TX (US)

(72) Inventors: Christopher J. Casella, Milford, MA (US); Frank Widjaja Yu, Austin, TX (US); Gregory Martin Allen, Layton, UT (US); Joseph P. King, Jr., Sterling, MA (US); Jonathan Jay Kellen, Dassel, MN (US)

(73) Assignee: Dell Products L.P., Round Rock, TX (US)

( * ) Notice: Subject to any disclaimer, the term of this patent is extended or adjusted under 35 U.S.C. 154(b) by 589 days.

(21) Appl. No.: 17/968,955

(22) Filed: Oct. 19, 2022

(65) Prior Publication Data

US 2024/0134655 A1      Apr. 25, 2024
US 2024/0231841 A9      Jul. 11, 2024

(51) Int. Cl.
*G06F 9/445* (2018.01)
*G06F 9/4401* (2018.01)

(52) U.S. Cl.
CPC ........ *G06F 9/44505* (2013.01); *G06F 9/4401* (2013.01); *G06F 9/4411* (2013.01)

(58) Field of Classification Search
None
See application file for complete search history.

(56) References Cited

U.S. PATENT DOCUMENTS

| | | | |
|---|---|---|---|
| 7,328,333 B2 * | 2/2008 | Kawano | ................... G06F 1/24 713/1 |
| 8,756,365 B2 | 6/2014 | Sharon et al. | |
| 10,891,140 B1 * | 1/2021 | Levin | .................. G06F 9/45533 |
| 10,956,178 B1 * | 3/2021 | Hayward | ................. G06F 9/54 |
| 2004/0215433 A1 * | 10/2004 | Roesner | ................. G06F 30/30 703/14 |
| 2009/0150881 A1 * | 6/2009 | Lupini | ...................... G06F 8/61 717/174 |
| 2013/0054005 A1 * | 2/2013 | Stevens | ................ G06Q 10/087 700/216 |
| 2014/0006225 A1 * | 1/2014 | Bowman | .............. G06Q 10/087 705/28 |

(Continued)

*Primary Examiner* — Abu Zar Ghaffari
(74) *Attorney, Agent, or Firm* — Joseph Mencher

(57) ABSTRACT

A first component stock includes first hardware type components having a first hardware type. A second component stock includes second hardware type components having a second hardware type that is different than the first hardware type. A component configuration system identifies computing device order(s) for computing device(s) that include a plurality of components, and determines that a respective personality configuration in the computing device order(s) for each of a first subset of the plurality components included in the computing device(s) may be provided by the first hardware type components. The component configuration system then instructs the provisioning of the first hardware type components in the computing device(s), and configures each of the first hardware type components to operate according to the respective personality configuration for each of the first subset of the plurality components.

17 Claims, 21 Drawing Sheets

(56) References Cited

U.S. PATENT DOCUMENTS

| | | | |
|---|---|---|---|
| 2014/0201425 A1* | 7/2014 | Clark | G06F 3/067 |
| | | | 711/103 |
| 2014/0297893 A1* | 10/2014 | Ashok | G06F 13/10 |
| | | | 710/8 |
| 2015/0199189 A1* | 7/2015 | Nadon | G06F 9/451 |
| | | | 713/1 |
| 2016/0246596 A1* | 8/2016 | Candelaria | G06F 11/2247 |
| 2017/0109052 A1* | 4/2017 | Crawford | G06F 3/0605 |
| 2017/0250864 A1* | 8/2017 | Alshinnawi | H04L 43/0817 |
| 2018/0329718 A1* | 11/2018 | Klein | G09G 5/14 |
| 2018/0336046 A1* | 11/2018 | Miyauchi | G06F 9/45558 |
| 2019/0087297 A1* | 3/2019 | Inbaraj | G06F 11/3034 |
| 2019/0253311 A1* | 8/2019 | Hockett | G06N 20/00 |
| 2019/0273654 A1* | 9/2019 | Liguori | G06F 9/5072 |
| 2021/0342487 A1 | 11/2021 | Yu et al. | |
| 2022/0114136 A1* | 4/2022 | Zhu | G06F 9/4451 |
| 2022/0197665 A1* | 6/2022 | Arunachalam | G06N 7/01 |
| 2023/0109231 A1* | 4/2023 | Adogla | H04L 41/40 |
| | | | 709/223 |
| 2023/0119527 A1* | 4/2023 | Darji | G06F 9/4451 |
| | | | 713/100 |
| 2023/0334544 A1* | 10/2023 | Bryant | G06Q 30/0611 |

* cited by examiner

Figure 3:
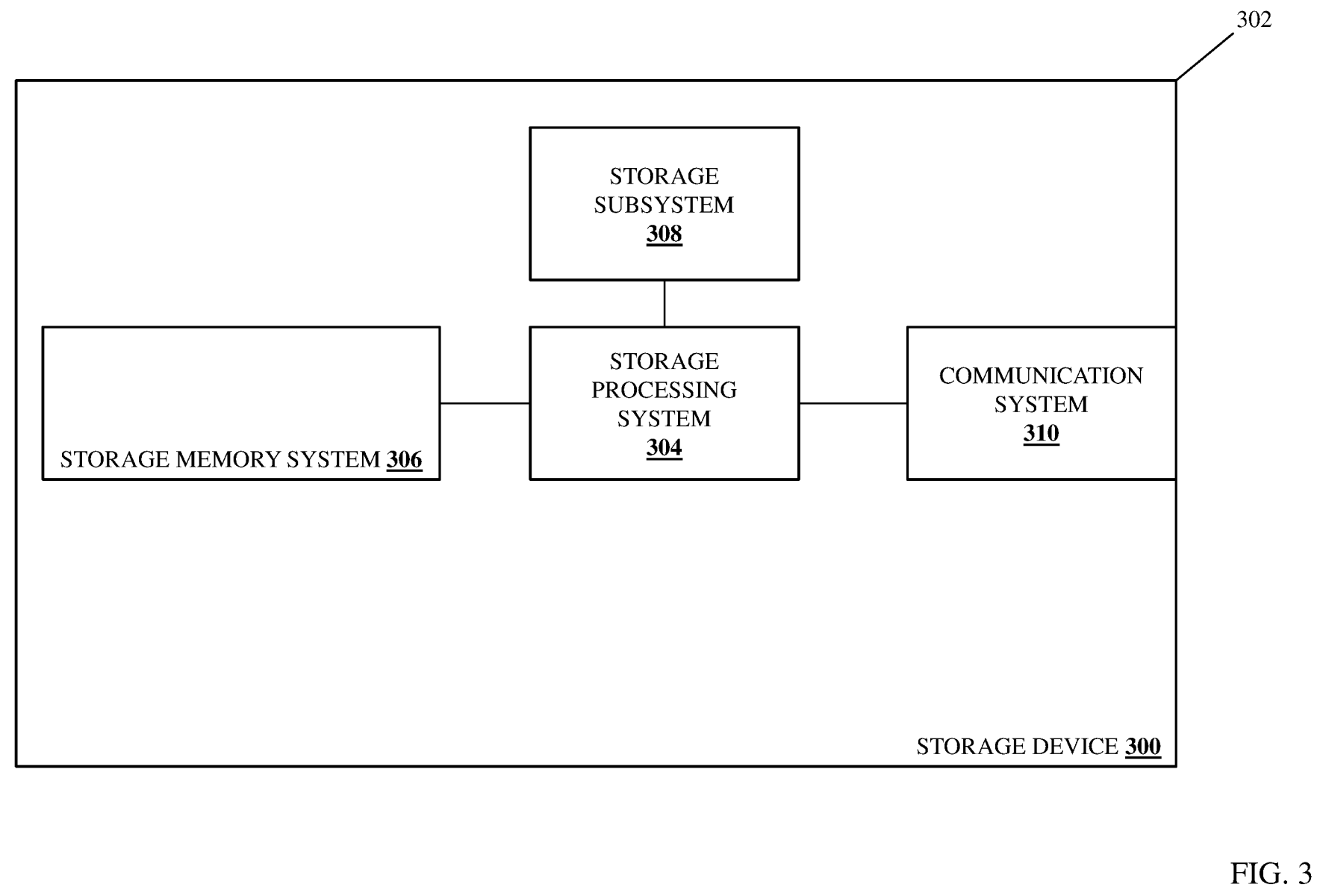

302

COMMUNICATION SYSTEM
310

STORAGE SUBSYSTEM
308

STORAGE PROCESSING SYSTEM
304

STORAGE MEMORY SYSTEM 306

STORAGE DEVICE 300

COMMUNICATION
SYSTEM
408

STORAGE DEVICE
CONFIGURATION
ENGINE
404

STORAGE DEVICE
CONFIGURATION
DATABASE
406

STORAGE DEVICE CONFIGURATION SYSTEM 400

500

FIG. 5

COMPONENT CONFIGURATION SYSTEM IDENTIFIES COMPUTING DEVICE ORDER(S) FOR COMPUTING DEVICE(S) INCLUDING COMPONENTS
502

COMPONENT CONFIGURATION SYSTEM DETERMINES PERSONALITY CONFIGURATION(S) FOR RESPECTIVE SUBSETS OF COMPONENTS ORDERED FOR COMPUTING DEVICE(S) THAT MAY BE PROVIDED BY PARTICULAR HARDWARE TYPE COMPONENTS
504

COMPONENT CONFIGURATION SYSTEM INSTRUCTS PROVISIONING OF PARTICULAR HARDWARE TYPE COMPONENTS IN COMPUTING DEVICE(S) BASED ON SUBSETS OF COMPONENTS ORDERED FOR THE COMPUTING DEVICE(S) HAVING PERSONALITY CONFIGURATION(S) SATISFIED BY THOSE PARTICULAR HARDWARE TYPE COMPONENTS
506

COMPONENT CONFIGURATION SYSTEM CONFIGURES PARTICULAR HARDWARE TYPE COMPONENTS IN COMPUTING DEVICE(S) TO OPERATE ACCORDING TO PERSONALITY CONFIGURATION(S) FOR RESPECTIVE SUBSETS OF COMPONENTS ORDERED FOR THE COMPUTING DEVICE(S)
508

402

STORAGE DEVICE CONFIGURATION SYSTEM 400

COMMUNICATION SYSTEM 408

916

STORAGE DEVICE CONFIGURATION ENGINE 404

918

STORAGE DEVICE CONFIGURATION DATABASE 406

Figure 10:
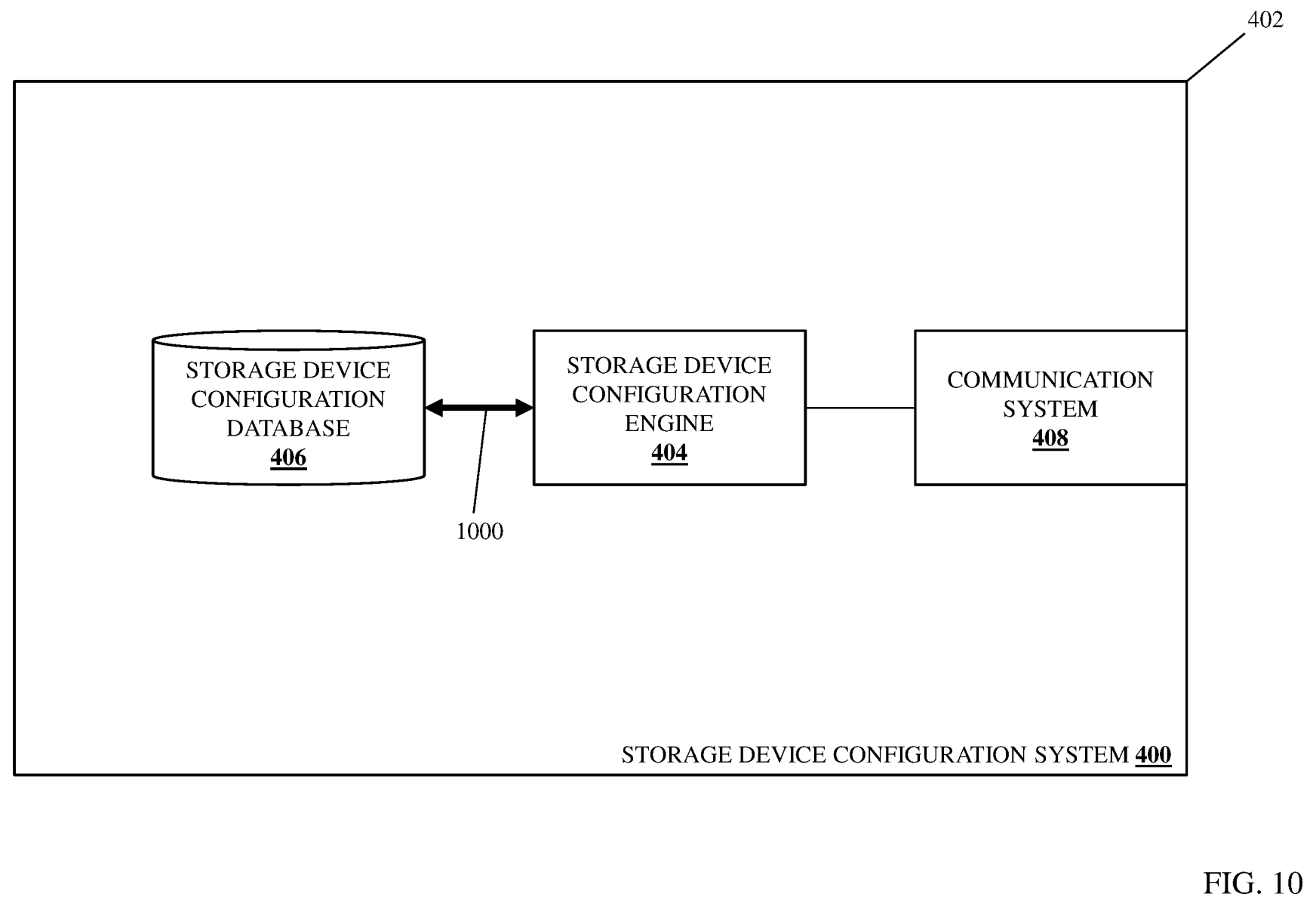

402

COMMUNICATION
SYSTEM
408

STORAGE DEVICE
CONFIGURATION
ENGINE
404

1000

STORAGE DEVICE
CONFIGURATION
DATABASE
406

STORAGE DEVICE CONFIGURATION SYSTEM 400

STORAGE DEVICE
CONFIGURATION
DATABASE
406

1200

STORAGE DEVICE
CONFIGURATION
ENGINE
404

1202

COMMUNICATION
SYSTEM
408

STORAGE DEVICE CONFIGURATION SYSTEM 400

Figure 12C:
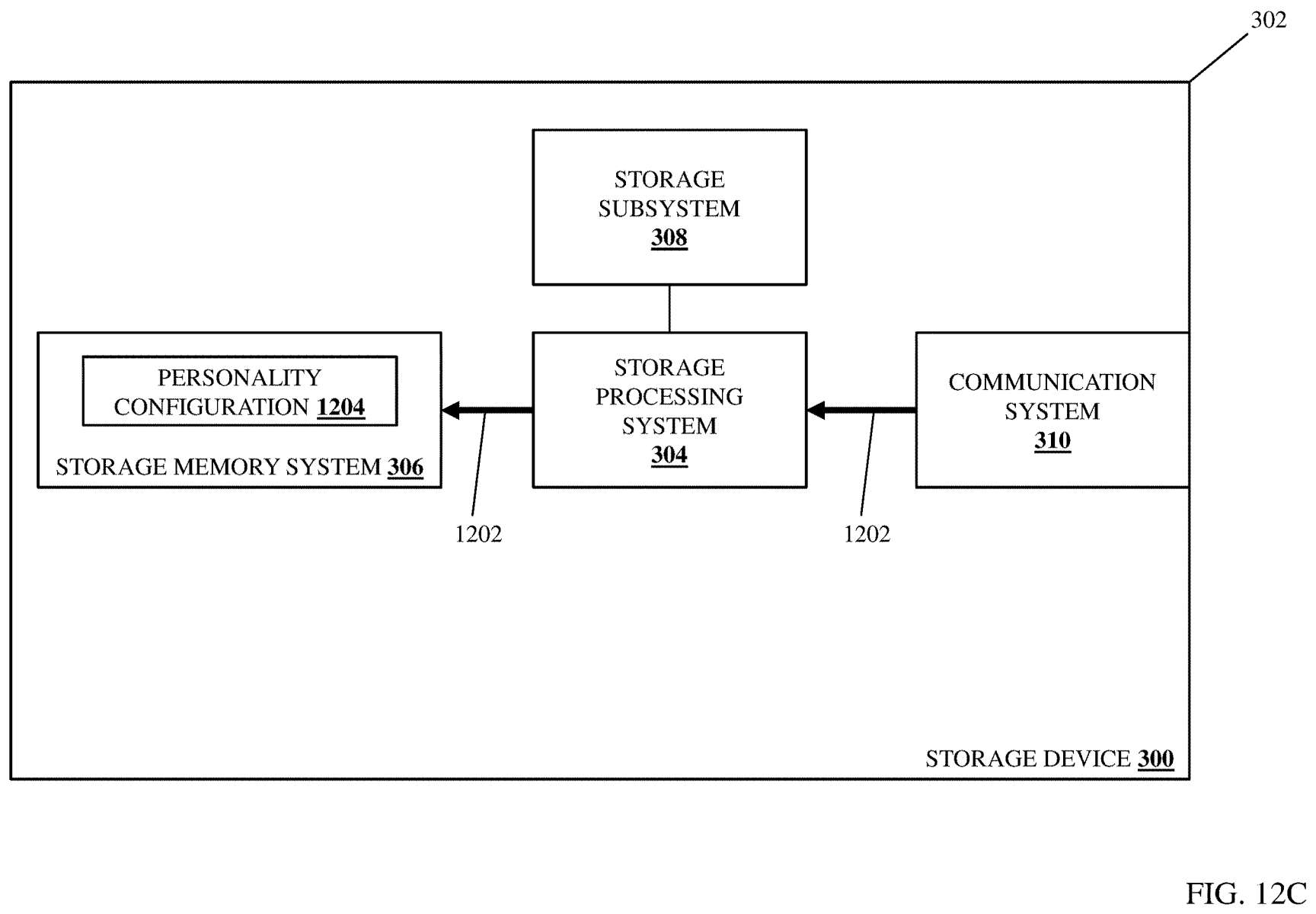

302

COMMUNICATION
SYSTEM
310

1202

STORAGE
SUBSYSTEM
308

STORAGE
PROCESSING
SYSTEM
304

1202

PERSONALITY
CONFIGURATION 1204

STORAGE MEMORY SYSTEM 306

STORAGE DEVICE 300

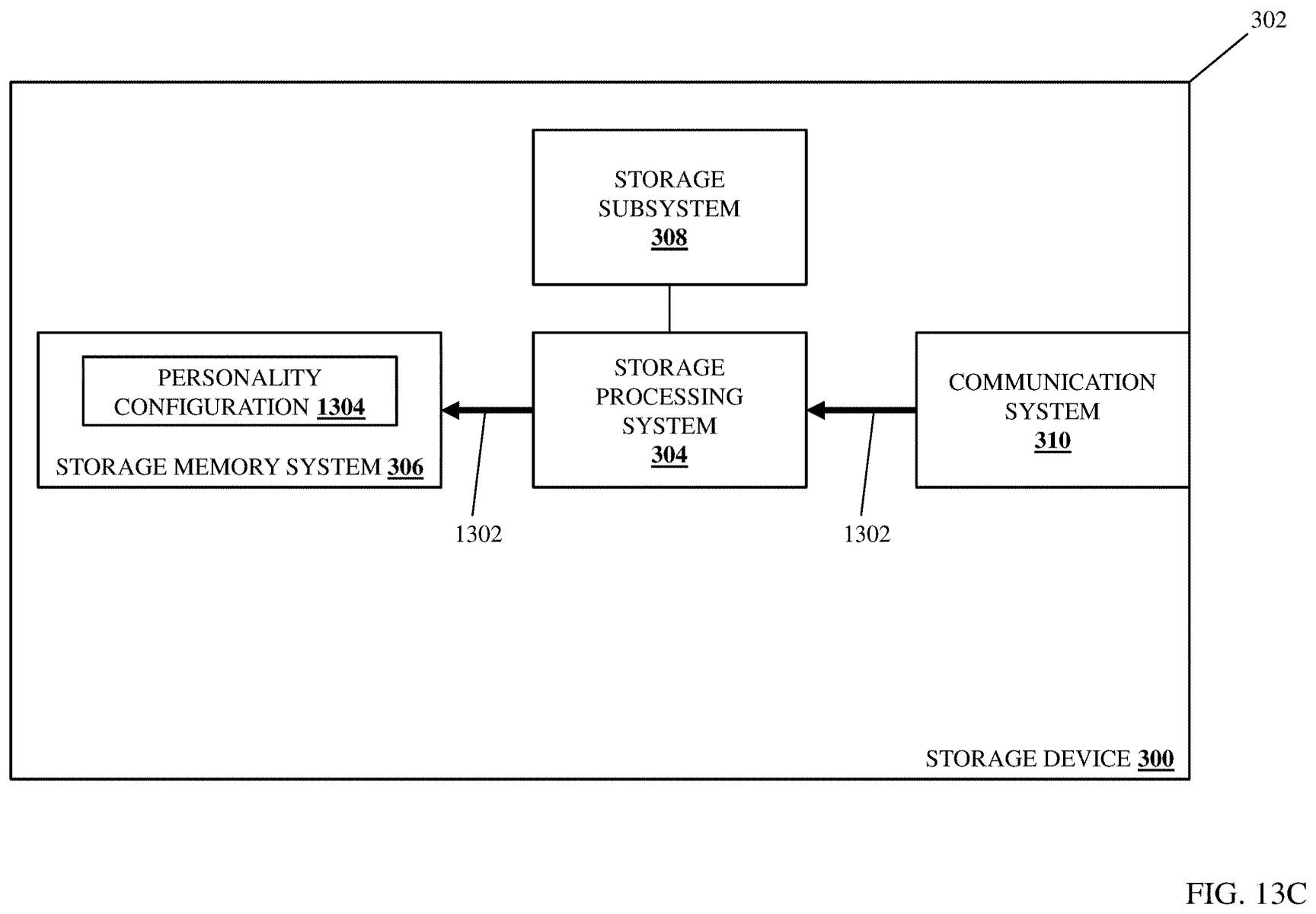

COMMUNICATION
SYSTEM
310

1302

STORAGE
SUBSYSTEM
308

STORAGE
PROCESSING
SYSTEM
304

1302

PERSONALITY
CONFIGURATION 1304

STORAGE MEMORY SYSTEM 306

STORAGE DEVICE 300

FIG. 13C

HARDWARE-TYPE-BASED MULTI-COMPONENT PERSONALITY CONFIGURATION SYSTEM

BACKGROUND

The present disclosure relates generally to information handling systems, and more particularly to configuring multiple components of the same hardware type with personality configurations for utilization in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, often utilize components that have configurations that provide for particular component operations. For example, the computing devices discussed above may be manufactured to include one or more storage devices that may have configurations that were requested by a customer and that provide for particular storage device operations. However, the manufacture of computing devices with storage devices having different configurations raises issues.

For example, storage devices used in computing devices may include a plurality of configurations that may include different hardware types, different firmware types, different endurance capabilities, different security functionality, and/or other storage device features known in the art. In conventional computing device manufacturing systems, the computing device manufacturer will stock storage devices having each combination of the features discussed above so that when any of those storage devices are requested in a computing device being manufactured, they may be provided in that computing device. As such, computing device manufacturers must order and stock storage devices from storage device manufacturers having first hardware types, first firmware types, first formatting, first endurance capabilities, and first security functionality; storage devices having second hardware types, second firmware types, second endurance capabilities, second formatting, and second security functionality; as well as all of the combinations in between (i.e., storage devices having the different combinations of first or second hardware types, first or second firmware types, first or second endurance capabilities, and first or second security functionality).

As will be appreciated by one of skill in the art in possession of the present disclosure, the conventional computing device manufacturing systems discussed above are subject to relatively high levels of complexity with regard to the storage device inventories, storage device manufacturer logistics, and/or other requirements to perform the computing device/storage device manufacturing operations discussed above. As such, computing device manufacturers often limit the number of storage device configurations that are available to customers ordering a computing device in order to keep the complexity discussed above at manageable levels. Thus, conventional computing device manufacturing systems suffer from trade-offs between computing device/ storage device manufacturing complexity and storage device configuration options available to customers.

Accordingly, it would be desirable to provide computing device/component manufacturing system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a component configuration engine that is configured to: identify at least one computing device order for at least one computing device that includes a plurality of components; determine that a respective personality configuration in the at least one computing device order for each of a first subset of the plurality components included in the at least one computing device may be provided by first hardware type components that are included in a first component stock and that have a first hardware type; instruct the provisioning of the first hardware type components in the at least one computing device; and configure each of the first hardware type components to operate according to the respective personality configuration for each of the first subset of the plurality components.

BRIEF DESCRIPTION OF THE DRAWINGS

FIG. 3 is a schematic view illustrating an embodiment of a storage device that may be provided using the hardware-type-based multi-component personality configuration system of the present disclosure.

FIG. 5 is a flow chart illustrating an embodiment of a method for configuring multiple components based on hardware types.

FIG. 10 is a schematic view illustrating an embodiment of the storage device configuration system of FIG. 4 operating during the method of FIG. 5.

FIG. 12C is a schematic view illustrating an embodiment of the storage device of FIG. 3 operating during the method of FIG. 5.

FIG. 13C is a schematic view illustrating an embodiment of the storage device of FIG. 3 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
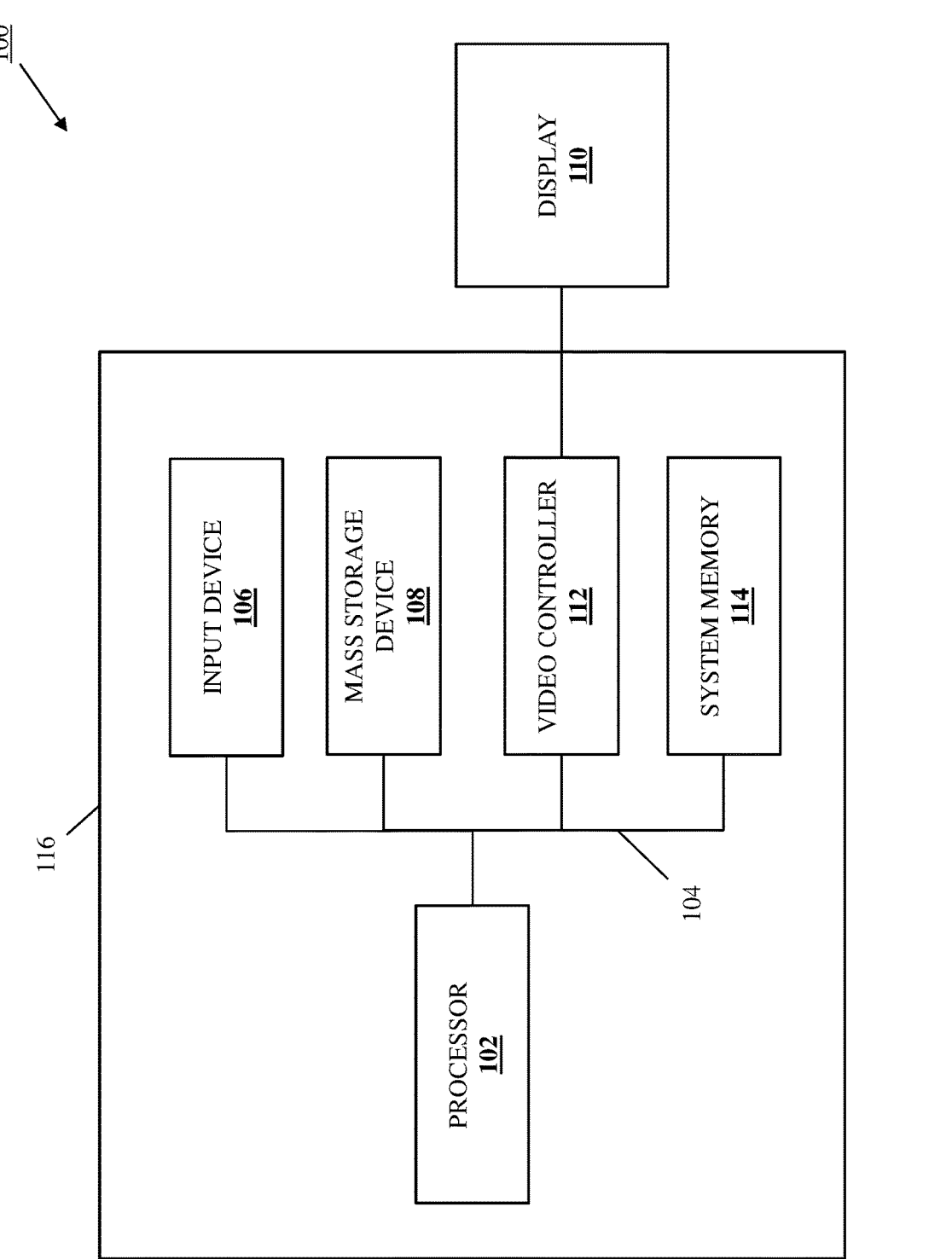
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
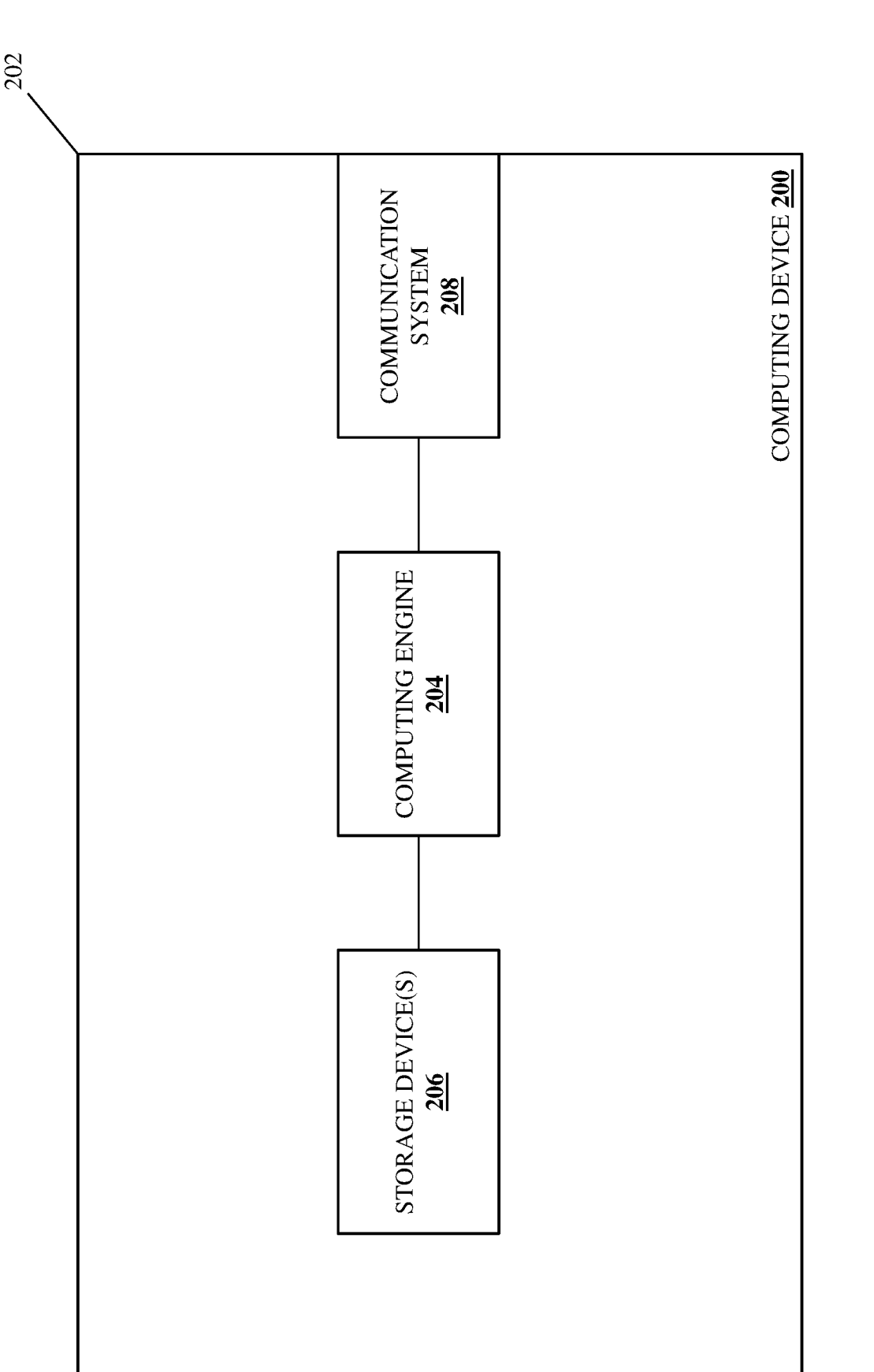
FIG. 2 is a schematic view illustrating an embodiment of a computing device that may include storage devices provided using the hardware-type-based multi-component personality configuration system of the present disclosure.

Referring now to FIG. 2, an embodiment of a computing device 200 is illustrated that may include components provided according to the teachings of the present disclosure. In an embodiment, the computing device 200 may be provided by the IHS 100 discussed above with reference to FIG. 1 and/or may include some or all of the components of the IHS 100, and in specific examples may be provided by server devices, storage systems, and/or other computing devices that one of skill in the art in possession of the present disclosure would recognize as utilizing component(s) provided according to the teachings of the present disclosure. However, while illustrated and discussed as being provided by particular computing devices, one of skill in the art in possession of the present disclosure will recognize that other devices may utilize the components provided according to the teachings of the present disclosure while remaining within its scope as well. In the illustrated embodiment, the computing device 200 includes a chassis 202 that houses the components of the computing device 200, only some of which are illustrated and discussed below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a computing engine 204 that is configured to perform any of a variety of computing functionality that would be apparent to one of skill in the art in possession of the present disclosure.

The chassis 202 may also house one or more components that may be provided according to the teachings of the present disclosure and that are illustrated and described below as being provided by one or more storage devices 206 that may be coupled to the computing engine 204 (e.g., via a coupling between the storage device(s) 206 and the processing system). However, while illustrated and described as being provided by storage devices, one of skill in the art in possession of the present disclosure will appreciate how a variety of other components may be provided with personality configurations as discussed below while remaining within the scope of the present disclosure as well. The chassis 202 may also house a communication system 208 that is coupled to the computing engine 204 (e.g., via a coupling between the communication system 208 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing device 200 has been illustrated and described, one of skill in the art in possession of the present disclosure will recognize that computing device including components provided according to the teachings of the present disclosure may include a variety of other configurations while remaining within the scope of the present disclosure as well.

Referring now to FIG. 3, an embodiment of a component that may be provided according to the teachings of the present disclosure is illustrated as being provided by a storage device 300. As such, the storage device 300 may be provided in the IHS 100 discussed above with reference to FIG. 1 (e.g., as the storage device 108), and in specific examples may be provided by an SSD storage device. However, while illustrated and discussed as being provided by a particular storage device, one of skill in the art in possession of the present disclosure will recognize that other types of components will fall within the scope of the present disclosure as well. In the illustrated embodiment, the storage device 300 includes a chassis 302 that houses the components of the storage device 300, only some of which are illustrated and discussed below.

For example, the chassis 302 may house a storage processing system 304 and a storage memory system 306 that is coupled to the storage processing system 304 and that, as discussed in further detail below, may be provided with personality configuration information that, when executed by the storage processing system 304, cause the storage processing system 304 to provide a storage engine (e.g., storage firmware and/or other storage engines known in the art) that is configured to perform the storage operations and/or other functionality of the storage engines and/or storage devices discussed below. As such, one of skill in the art in possession of the present disclosure will appreciate how the storage memory system 306 may be provided by non-volatile memory device(s) (e.g., like those utilized to provide storage firmware). In the simplified examples below, the configuration information and the storage processing system 304 operate to provide firmware, endurance capabilities, and security functionality that define the particular storage operations (e.g., the "personality" configuration) that the storage devices discussed below are configured to perform, but one of skill in the art in possession of the present disclosure will appreciate how other personality configuration features (e.g., storage device capacity, storage device sector size (e.g., a 512 byte sector size, a 4096 byte sector size, etc.), temperature-environment based operation, formatting, and/or other personality configuration features that would be apparent to one of skill in the art in possession of the present disclosure) will fall within the scope of the present disclosure as well.

As will be appreciated by one of skill in the art in possession of the present disclosure, the personality configurations provided for the storage devices or other components described herein are conventionally defined for the storage devices/components by a storage device/component manufacturer prior to providing those storage devices/components in computing devices, and the operating system in any particular computing device will be configured for a particular personality configuration of the storage device(s)/component(s) provided in its computing device (i.e., that operating system will "expect" the storage device(s)/component(s) to operate according to particular personality configuration(s)). As such, the personality configurations described herein may be "locked" or otherwise configured in a manner that prevents a customer from modifying those personality configurations following the provision of the computing device and its storage device(s)/component(s) to the customer. For example, the inventors of the present disclosure describe techniques for "one-time-programming" or otherwise locking a personality configuration for a storage device/component in U.S. patent application Ser. No. 16/863,668, filed on Apr. 30, 2020, the disclosure of which is incorporated by reference herein in its entirety.

One of skill in the art in possession of the present disclosure will recognize that the hardware-type-based multi-component personality configuration system of the present disclosure pushes the personality configuration of the storage device(s)/component(s) "into the future" and from the storage device/component manufacturer to the computing device manufacturer or even the customer, while ensuring that the personality configurations provided to those storage device(s)/component(s) cannot be easily modified (e.g., by applying the "one-time-programming"/locking techniques described by the inventors of the present disclosure in U.S. patent application Ser. No. 16/863,668, filed on Apr. 30, 2020, the disclosure of which is incorporated by reference herein in its entirety). However, as also discussed below, some of the inventors of the present disclosure have developed "secure one-time-programming undo" techniques that provide for the secure unlocking of a personality configuration for a storage device/component in U.S. patent application Ser. No. 17/942,855, filed on Sep. 12, 2022, the disclosure of which is incorporated by reference herein in its entirety as well.

As such, while some embodiments of the present disclosure allow for the provisioning and locking of personality configurations on storage device(s)/component(s), along with the subsequent secure unlocking of those personality configurations on storage device(s)/component(s) for modification and subsequent locking, one of skill in the art in possession of the present disclosure will appreciate the difference between the personality configurations described herein and conventional storage device/component firmware that may be modified using conventional storage device/component firmware update operations. To provide a specific example, the personality configurations provided according to the teachings of the present disclosure may configure a storage device/component for particular firmware "types" (e.g., a "channel"/industry standard firmware type, a computing-device-manufacturer unique firmware type, etc.) and, once that personality configuration is locked on that storage device/component, subsequent firmware updates for that storage device/component will be limited to the updating of that particular firmware type (i.e., absent the performance of the secure unlocking described in U.S. patent application Ser. No. 17/942,855, filed on Sep. 12, 2022, the disclosure of which is incorporated by reference herein in its entirety as well).

The chassis 302 may also house a storage subsystem 308 that is coupled to the storage processing system 304 and that, in a specific example, may be provided by a NAND storage subsystem. However, while described below as being provided by a NAND storage subsystem, one of skill in the art in possession of the present disclosure will appreciate how the storage subsystem 308 may be provided by other storage technologies while remaining within the scope of the present disclosure as well. As discussed below, the storage subsystem 308 and/or other hardware components of the storage device may define a "hardware type" of the storage device 300, with different hardware types of storage devices having different storage subsystems and/or other hardware components.

For example, a particular hardware type storage device may include a storage subsystem with a particular storage capacity (e.g., 500 GB, 1 TB, 2 TB, etc.), with a quantity of NAND die present in a storage device providing a specific example of hardware that provides a particular storage capacity. In another example, a particular hardware type storage device may include particular NAND storage technology (e.g., Single-Level Cell (SLC), Multi-Level Cell (MLC), Triple-Level Cell (TLC), Quad-Level Cell (QLC), serial NAND, etc.). In yet another example, a particular hardware type storage device may include particular interface types (e.g., a Non-Volatile Memory express (NVMe)/Peripheral Component Interconnect express (PCIe) interface, a Serial Attached Small Computer System Interface (SCSI) (SAS) interface, a Serial Advanced Technology Attachment (SATA) interface, etc.), and for any particular interface type the storage device may operate at different speeds that are based on the hardware generation of that storage device (e.g., PCIe generation 3 (Gen3), Gen4, Gen5, etc.).

In yet another example, a particular hardware type storage device may include a particular form factor (e.g., a U.2 form factor, an M.2 form factor, an Enterprise and Datacenter Solid State Drive (SSD) Form Factor (EDSFF), etc.). In yet another example, a particular hardware type storage device may include a particular number of internal NAND channels (e.g., 8 internal NAND channels, 16 internal NAND channels, etc.), with more internal NAND channels providing higher performance due to the ability of a controller to send and receive data to and from multiple NAND die simultaneously. In yet another example, a particular hardware type storage device may include a particular security configuration (e.g., a security-enabled Trusted Computing Group-Secure Encrypted Drive (TCG-SED) security configuration that may include an Advanced Encryption Standard (AES) engine configurated to encrypt/decrypt data via a built-in media encryption key, a non-security-enabled Instant Secure Erase (ISE) security configuration, etc.). In yet another example, a particular hardware type storage device may include a particular Federal Information Processing Standard (FIPS) certification, with different FIPS certification levels possibly including different hardware. However, while specific examples of storage device hardware types have been described above, one of skill in the art in possession of the present disclosure will appreciate how storage device hardware types (or other component hardware types) may be defined in a variety of manners that will fall within the scope of the present disclosure as well.

The chassis 302 may also house a communication system 310 that is coupled to the storage processing system 304 and that may be provided by any of a variety of storage device communication components that would be apparent to one of skill in the art in possession of the present disclosure. However, while a specific component provided by the storage device 300 has been illustrated and described, one of skill in the art in possession of the present disclosure will recognize that components provided according to the teachings of the present disclosure may include a variety of components and/or component configurations for providing conventional component functionality, as well as any of the functionality discussed below, while remaining within the scope of the present disclosure as well.

Figure 4:
FIG. 4 is a schematic view illustrating an embodiment of a storage device configuration system that may provide the hardware-type-based multi-component personality configuration system of the present disclosure.

Referring now to FIG. 4, an embodiment of a component configuration system is illustrated that is provided by a storage device configuration system 400 that may provide the hardware-type-based multi-component personality configuration system of the present disclosure. In an embodiment, the storage device configuration system 400 may be provided by the IHS 100 discussed above with reference to FIG. 1 and/or may include some or all of the components of the IHS 100, and in specific examples may be provided by one or more server devices. However, while illustrated and discussed as being provided by server device(s), one of skill in the art in possession of the present disclosure will recognize that the functionality of the storage device configuration system 400 discussed below may be provided by other devices that are configured to operate similarly as the storage device configuration system 400 discussed below. In the illustrated embodiment, the storage device configuration system 400 includes a chassis 402 that houses the components of the storage device configuration system 400, only some of which are illustrated and discussed below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a storage device configuration engine 404 that is configured to perform the functionality of the storage device configuration engines/systems and/or component configuration engines/systems discussed below.

The chassis 402 may also house a storage system (not illustrated, but which may include the storage 108 discussed above with reference to FIG. 1) that is coupled to the storage device configuration engine 404 (e.g., via a coupling between the storage system and the processing system) and that includes a storage device configuration database 406 that is configured to store any of the information utilized by the storage device configuration engine 404 discussed below. The chassis 402 may also house a communication system 408 that is coupled to the storage device configuration engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific storage device configuration system 400 has been illustrated and described, one of skill in the art in possession of the present disclosure will recognize that storage device configuration systems (or other component configuration systems operating according to the teachings of the present disclosure in a manner similar to that described below for the storage device configuration system 400) may include a variety of configurations for providing the functionality discussed below while remaining within the scope of the present disclosure as well.

Referring now to FIG. 5, an embodiment of a method 500 for configuring multiple components based on hardware types is illustrated. As discussed below, the systems and methods of the present disclosure utilize a stock of hardware type components with different hardware types, and provide for the manufacture of computing devices with components that are ordered with personality configurations that may be satisfied by the same hardware type component by providing each of those computing devices with that hardware type component, and then providing the personality configurations on those components either during the manufacture of the computing device or at a customer location. For example, the hardware-type-based multi-component personality configuration system of the present disclosure may include a first component stock including first hardware type components having a first hardware type, a second component stock including second hardware type components having a second hardware type that is different than the first hardware type, and a component configuration system. The component configuration system identifies computing device order(s) for computing device(s) that include a plurality of components, and determines that a respective personality configuration in the computing device order(s) for each of a first subset of the plurality components included in the computing device(s) may be provided by the first hardware type components. The component configuration system then instructs the provisioning of the first hardware type components in the computing device(s), and configures each of the first hardware type components to operate according to the respective personality configuration for each of the first subset of the plurality components. As such, computing device/component manufacturing complexity is reduced relative to conventional computing device manufacturing systems.

Figure 6:
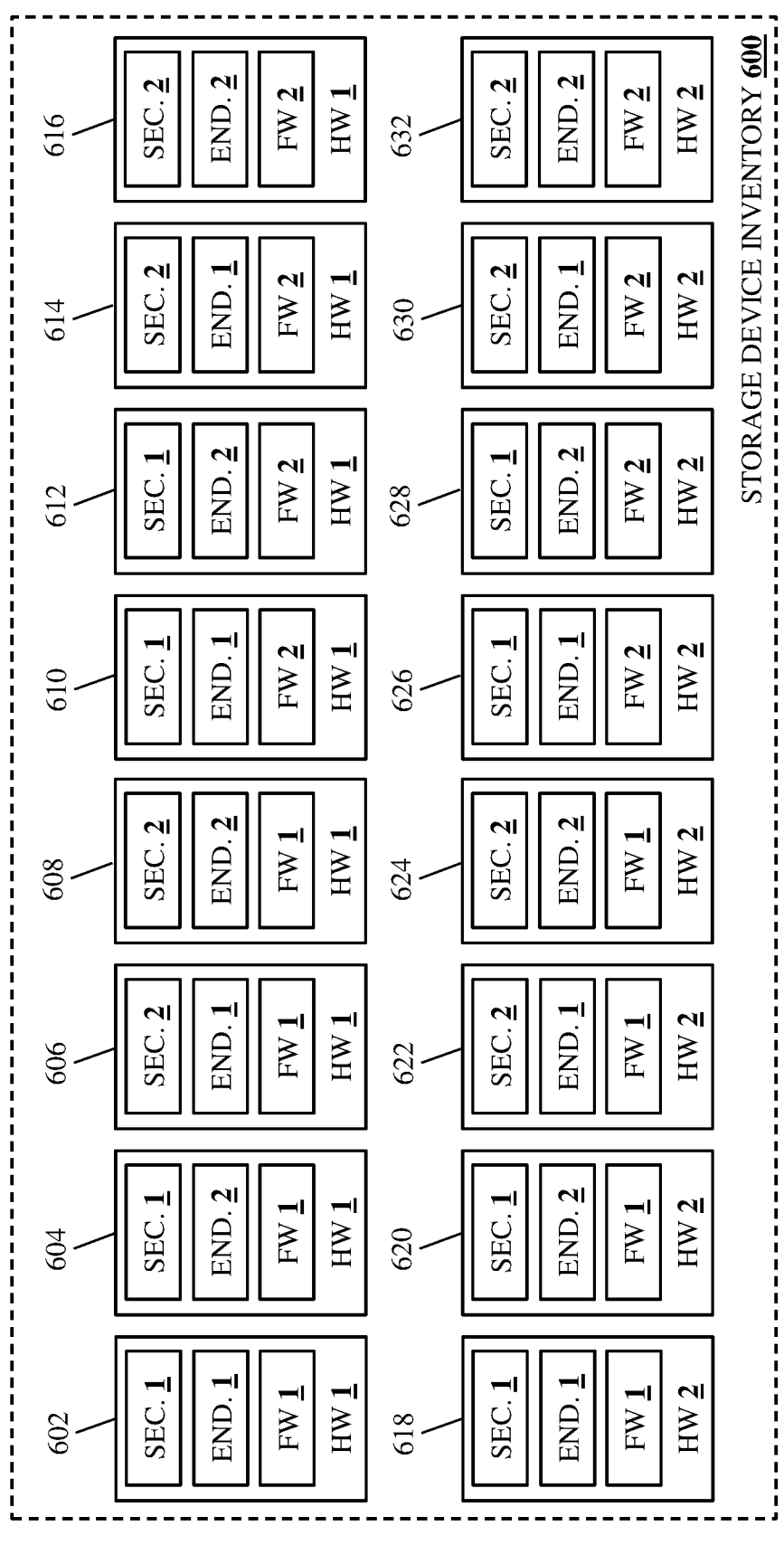
FIG. 6 is a schematic view illustrating an embodiment of a conventional component inventory.
Figure 7A:
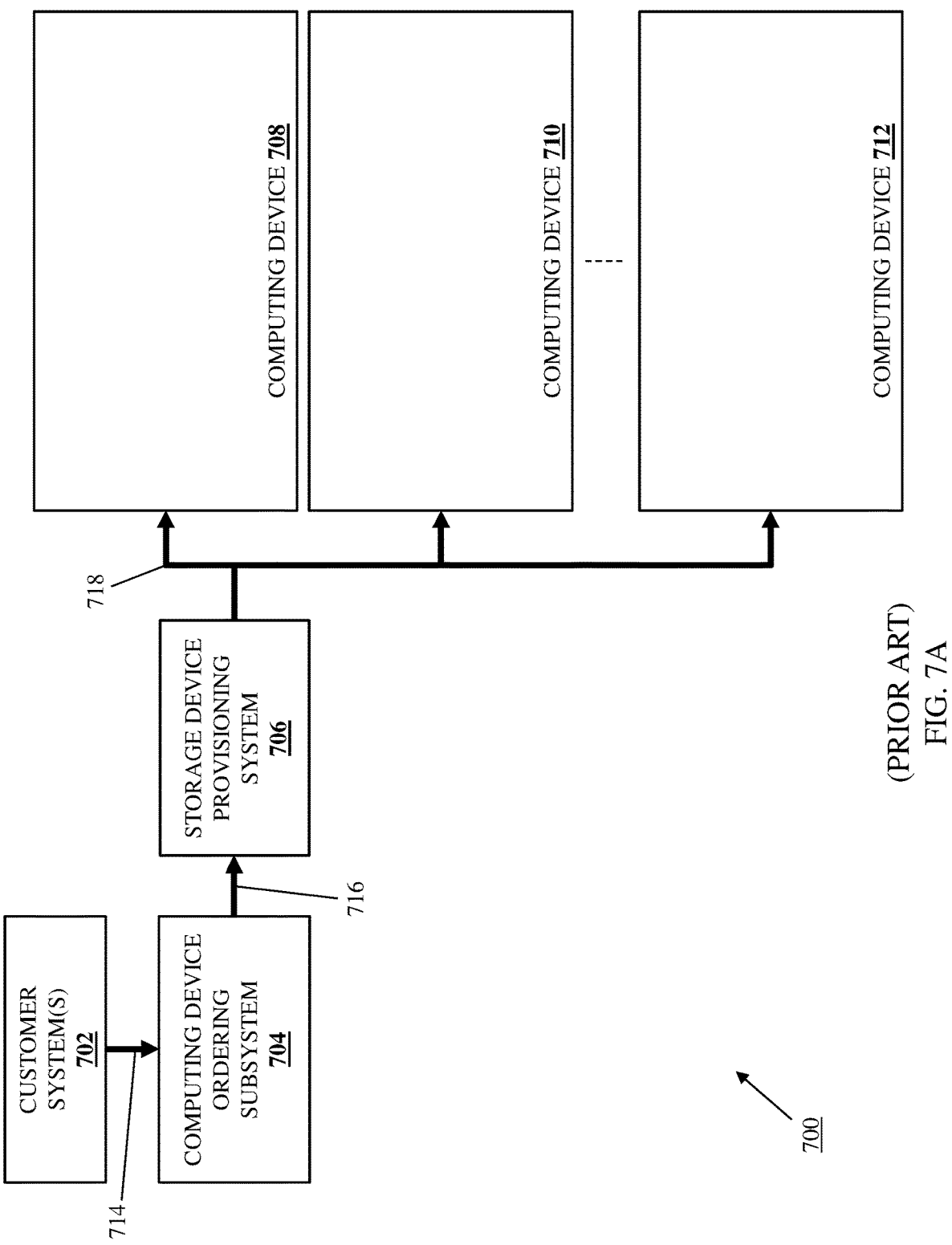
FIG. 7A is a schematic view illustrating an embodiment of the conventional manufacture of computing devices to include components having different configurations.
Figure 7B:
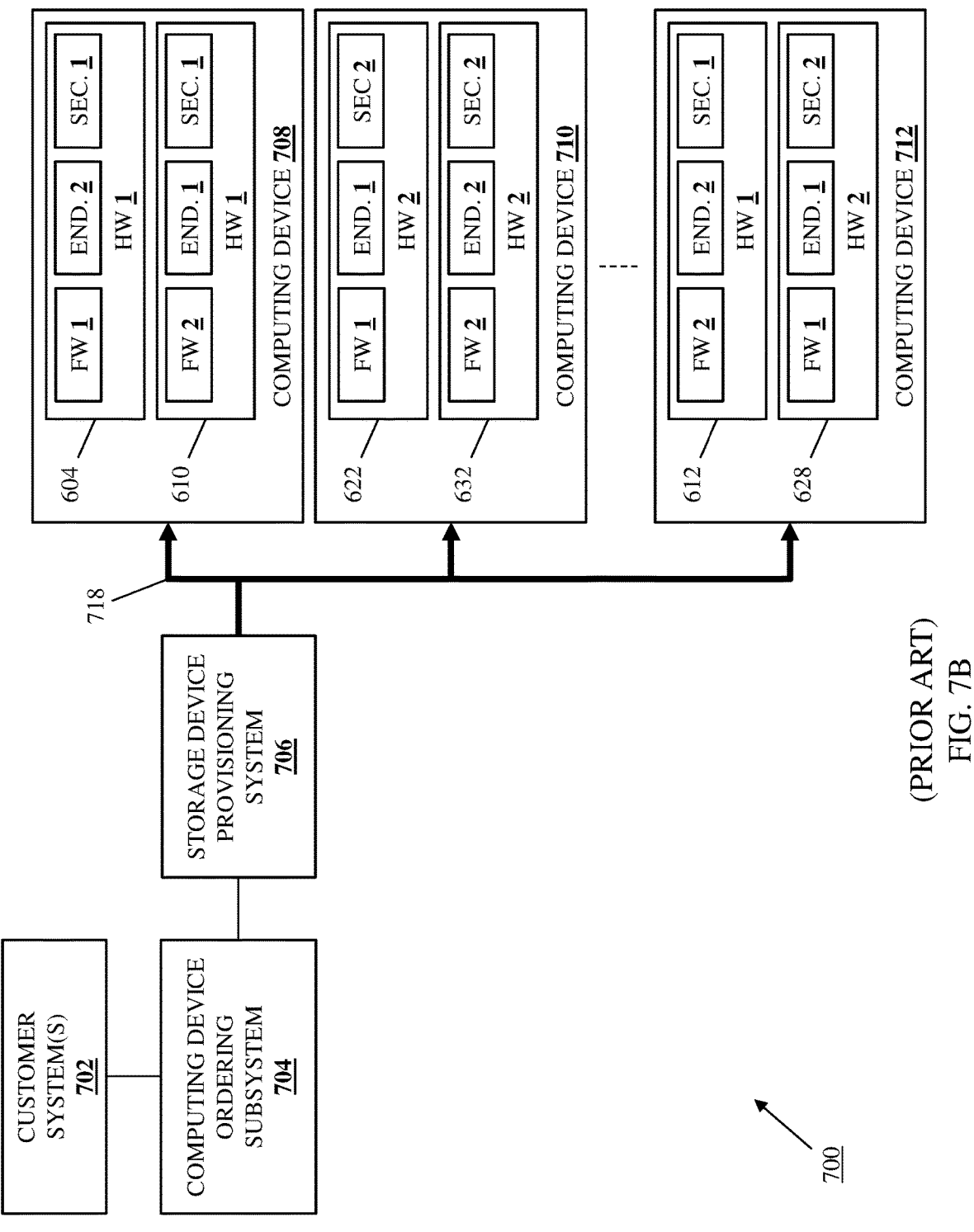
FIG. 7B is a schematic view illustrating an embodiment of the conventional manufacture of computing devices to include components having different configurations.

With reference to FIGS. 6, 7A, and 7B, an embodiment of the conventional manufacture of computing devices with storage devices is illustrated and briefly described for comparison to the hardware-type-based multi-component personality configuration system of the present disclosure, and while the examples below include storage devices as the components provided in the computing devices being manufactured, one of skill in the art in possession of the present disclosure will appreciate how the storage devices discussed below may be replaced by other types of components while remaining within the scope of the present disclosure as well. With reference to FIG. 6, an embodiment of a conventional storage device inventory 600 is illustrated. As discussed above, conventional storage device inventories stock storage devices having each combination of the features that are available to customers so that when any of those storage devices are requested by the customer for a computing device being manufactured, they may be provided in that computing device (a practice that is also referred to as a "one-to-one" order/component matching inventory). The conventional storage device inventory 600 illustrates a situation in which 16 different combinations of storage device hardware, storage device firmware type, storage device endurance capabilities, and storage device security functionality are available to customers, thus requiring the stocking/inventory of a plurality of each of those 16 combinations.

For example, the conventional storage device inventory 600 in the illustrated embodiment includes a plurality of storage devices 602 that have a first hardware type ("HW 1") and that have been configured by a storage device manufacturer with a first firmware type ("FW 1"), first endurance capabilities ("END. 1"), and first security functionality ("SEC. 1"); a plurality of storage devices 604 that have the first hardware type ("HW 1") and that have been configured by a storage device manufacturer with the first firmware type ("FW 1"), second endurance capabilities ("END. 2"), and the first security functionality ("SEC. 1"); a plurality of storage devices 606 that have the first hardware type ("HW 1") and that have been configured by a storage device manufacturer with the first firmware type ("FW 1"), the first endurance capabilities ("END. 1"), and second security functionality ("SEC. 2"); a plurality of storage devices 608 that have the first hardware type ("HW 1") and that have been configured by a storage device manufacturer with the first firmware type ("FW 1"), the second endurance capabilities ("END. 2"), and the second security functionality ("SEC. 2"); a plurality of storage devices 610 that have the first hardware type ("HW 1") and that have been configured by a storage device manufacturer with a second firmware type ("FW 2"), the first endurance capabilities ("END. 1"), and the first security functionality ("SEC. 1"); a plurality of storage devices 612 that have the first hardware type ("HW 1") and that have been configured by a storage device manufacturer with the second firmware type ("FW 2"), the second endurance capabilities ("END. 2"), and the first security functionality ("SEC. 1"); a plurality of storage devices 614 that have the first hardware type ("HW 1") and that have been configured by a storage device manufacturer with the second firmware type ("FW 2"), the first endurance capabilities ("END. 1"), and the second security functionality ("SEC. 2"); and a plurality of storage devices 616 that have the first hardware type ("HW 1") and that have been configured by a storage device manufacturer with the second firmware type ("FW 2"), the second endurance capabilities ("END. 2"), and the second security functionality ("SEC. 2").

Similarly, the conventional storage device inventory 600 in the illustrated embodiment includes a plurality of storage devices 618 that have a second hardware type ("HW 2") and that have been configured by a storage device manufacturer with the first firmware type ("FW 1"), the first endurance capabilities ("END. 1"), and the first security functionality ("SEC. 1"); a plurality of storage devices 620 that have the second hardware type ("HW 2") and that have been configured by a storage device manufacturer with the first firmware type ("FW 1"), the second endurance capabilities ("END. 2"), and the first security functionality ("SEC. 1"); a plurality of storage devices 622 that have the second hardware type ("HW 2") and that have been configured by a storage device manufacturer with the first firmware type ("FW 1"), the first endurance capabilities ("END. 1"), and the second security functionality ("SEC. 2"); a plurality of storage devices 624 that have the second hardware type ("HW 2") and that have been configured by a storage device manufacturer with the first firmware type ("FW 1"), the second endurance capabilities ("END. 2"), and the second security functionality ("SEC. 2"); a plurality of storage devices 626 that have the second hardware type ("HW 2") and that have been configured by a storage device manufacturer with second firmware type ("FW 2"), the first endurance capabilities ("END. 1"), and the first security functionality ("SEC. 1"); a plurality of storage devices 628 that have the second hardware type ("HW 2") and that have been configured by a storage device manufacturer with the second firmware type ("FW 2"), the second endurance capabilities ("END. 2"), and the first security functionality ("SEC. 1"); a plurality of storage devices 630 that have the second hardware type ("HW 2") and that have been configured by a storage device manufacturer with the second firmware type ("FW 2"), the first endurance capabilities ("END. 1"), and the second security functionality ("SEC. 2"); and a plurality of storage devices 632 that have the second hardware type ("HW 2") and that have been configured by a storage device manufacturer with the second firmware type ("FW 2"), the second endurance capabilities ("END. 2"), and the second security functionality ("SEC. 2").

As will be appreciated by one of skill in the art in possession of the present disclosure, the conventional storage device inventory 600 provides a simplified example of four storage device features (i.e., hardware type, firmware type, endurance capabilities, and security functionality) that each include two different options, resulting in the need to stock the 16 different configurations of storage devices discussed above, and real-world scenarios may include more storage device features and/or more options for those storage devices features that result in much larger storage device inventories that those illustrated in the examples provided herein.

With reference to FIGS. 7A and 7B, an embodiment of a conventional computing device manufacturing system 700 is illustrated that includes one or more customer systems 702 that one of skill in the art in possession of the present disclosure will appreciate may include any computing devices and/or other systems that are configured to allow for the ordering of the computing devices that include storage devices as discussed below. The customer system(s) 702 are coupled to a computing device ordering subsystem 704 that may include one or more server devices that are configured to receive orders for the computing devices that include storage devices as discussed below. A storage device provisioning system 706 is coupled to the computing device ordering subsystem 704, and may include any subsystem in the conventional computing device manufacturing system 700 that one of skill in the art in possession of the present disclosure will recognize as providing for the inclusion of components in computing devices being manufactured using the conventional computing device manufacturing system 700. As such, as illustrated in FIG. 7A, the storage device provisioning system 706 may be coupled to a plurality of computing devices 708, 710, and up to 712 that, as discussed below, are being manufactured using the conventional computing device manufacturing system 700.

As illustrated in FIG. 7A, the customer system(s) 702 may perform computing device ordering operations 714 that include providing computing device ordering information for one or more computing devices to the computing device ordering subsystem 704, which as discussed below may identify storage device configuration(s) that define the hardware type, firmware type, endurance capabilities, and security functionality for storage devices in those computing device(s), and the computing device ordering subsystem 704 may receive and store that computing device ordering information using a variety of techniques known in the art. The storage device provisioning system 706 may then perform computing device ordering information retrieval operations 716 that include retrieving the computing device ordering information from the computing device ordering subsystem 704, as well as computing device manufacturing operations 718 that include using that computing device ordering information to begin the manufacture of a plurality of computing devices 708, 710, and up to 712. As will be appreciated by one of skill in the art in possession of the present disclosure, the computing device manufacturing operations 718 may include retrieving a chassis identified in the computing device ordering information for each of the computing devices 708, 710, and 712, providing components identified in the computing device ordering information in that chassis, and coupling those components together, as well as a variety of other computing device manufacturing operations known in the art.

With reference to FIG. 7B, the computing device manufacturing operations 718 may include retrieving storage devices identified in the computing device ordering information for each of the computing devices 708, 710, and 712, and providing those storage devices in the chassis identified in the computing device ordering information for each of the computing devices 708, 710, and 712. In the illustrated embodiment, the computing device ordering information for the computing device 708 identifies one of each of the storage devices 604 and 610 in the conventional storage device inventory 600, and thus the computing device manufacturing operations 718 include retrieving a storage device 604 and a storage device 610 from the conventional storage device inventory 600 and providing them in the computing device 708. Similarly, the computing device ordering information for the computing device 710 the illustrated embodiment identifies one of each of the storage devices 622 and 632 in the conventional storage device inventory 600, and thus the computing device manufacturing operations 718 include retrieving a storage device 622 and a storage device 632 from the conventional storage device inventory 600 and providing them in the computing device 710. Similarly as well, the computing device ordering information for the computing device 712 the illustrated embodiment identifies one of each of the storage devices 612 and 628 in the conventional storage device inventory 600, and thus the computing device manufacturing operations 718 include retrieving a storage device 612 and a storage device 628 from the conventional storage device inventory 600 and providing them in the computing device 712.

As discussed above, the conventional computing device manufacturing system 700 (and those like it) are subject to relatively high levels of complexity with regard to the number of differently configured storage devices that must be stocked in the conventional storage device inventory 600, storage device manufacturer logistics, and/or other requirements to perform the computing device/storage device manufacturing operations discussed above. As such, computing device manufacturers often limit the number of storage device configurations that are available to customers ordering a computing device in order to keep the complexity discussed above at manageable levels. Thus, conventional computing device manufacturing systems suffer from trade-offs between computing device/storage device manufacturing complexity and storage device configuration options available to customers. As discussed below, the method 500 reduces the computing device/storage device manufacturing complexity discussed above while allowing the number of customer storage device configuration options to be increased relative to conventional computing device manufacturing systems.

Figure 8:
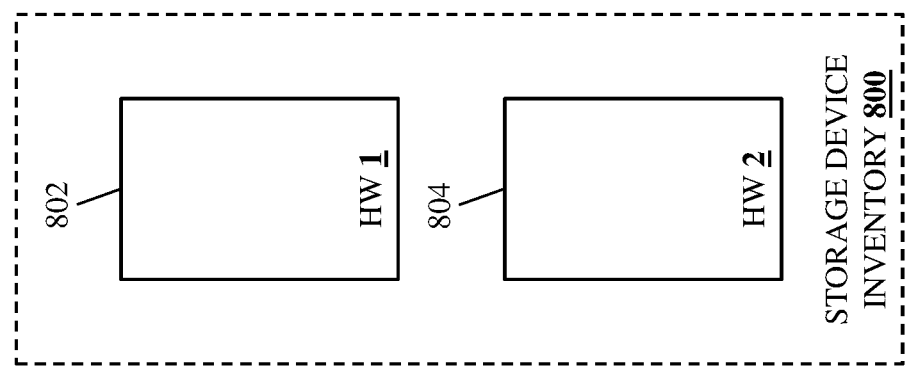
FIG. 8 is a schematic view illustrating an embodiment of a component inventory used in the hardware-type-based multi-component personality configuration system of the present disclosure.

With reference to FIG. 8, an embodiment of a storage device inventory 800 that may be used with hardware-type-based multi-component personality configuration system of the present disclosure is illustrated. As discussed in further detail below, component inventories provided according to the teachings of the present disclosure may stock different hardware type components having different hardware types, and then provide personality configurations on any of those components to configure those components as defined in the computing device ordering information for the computing device in which they are included. As will be appreciated by one of skill in the art in possession of the present disclosure, the storage device inventory 800 provided in FIG. 8 allows the hardware-type-based multi-component personality configuration system of the present disclosure to satisfy any computing device/storage device order that is satisfied by the conventional storage device inventory 600 discussed above with reference to FIG. 6, as well as additional computing device/storage device orders that could not be satisfied by the conventional storage device inventory 600. Furthermore, one of skill in the art in possession of the present disclosure will appreciate how each two-option feature of the storage device configurations in the conventional storage device inventory 600 (e.g., the firmware type, endurance configuration, or security functionality) will have the corresponding stock of storage devices in the storage device inventory 800 reduced by a factor of two (i.e., by the need to stock one hardware type storage device vs. two hardware type/feature storage devices).

As such, the storage device inventory 800 in the illustrated embodiment includes a plurality of storage devices 802 that have a first hardware type ("HW 1"), and a plurality of storage devices 804 that have the second hardware type ("HW 2"). To provide a simplified example, the first hardware type of the storage devices 802 may include NAND device hardware that provides a storage device capacity of 500 GB, while the second hardware type of the storage devices 804 may include NAND device hardware that provides a storage device capacity of 1 TB. To provide another simplified example, the first hardware type of the storage devices 802 may include NAND device hardware that includes a first type of NAND storage technology (e.g., Single-Level Cell (SLC), Multi-Level Cell (MLC), Triple-Level Cell (TLC), Quad-Level Cell (QLC), serial NAND, etc.), while the second hardware type of the storage devices 804 may include NAND device hardware that includes a second type of NAND storage technology that is different than the first type of NAND storage technology. However, while simplified storage device inventories that includes only two different hardware type storage devices with particular hardware features are illustrated and described herein, one of skill in the art in possession of the present disclosure will appreciate how any of the different hardware type storage devices discussed above, as well as other hardware type storage devices that would be apparent to one of skill in the art in possession of the present disclosure, may be provided in the storage device inventory 800, and how the addition of other different hardware type storage devices and/or other hardware features may increase the customer storage device configuration options and/or provide other benefits while remaining within the scope of the present disclosure as well.

Figure 9A:
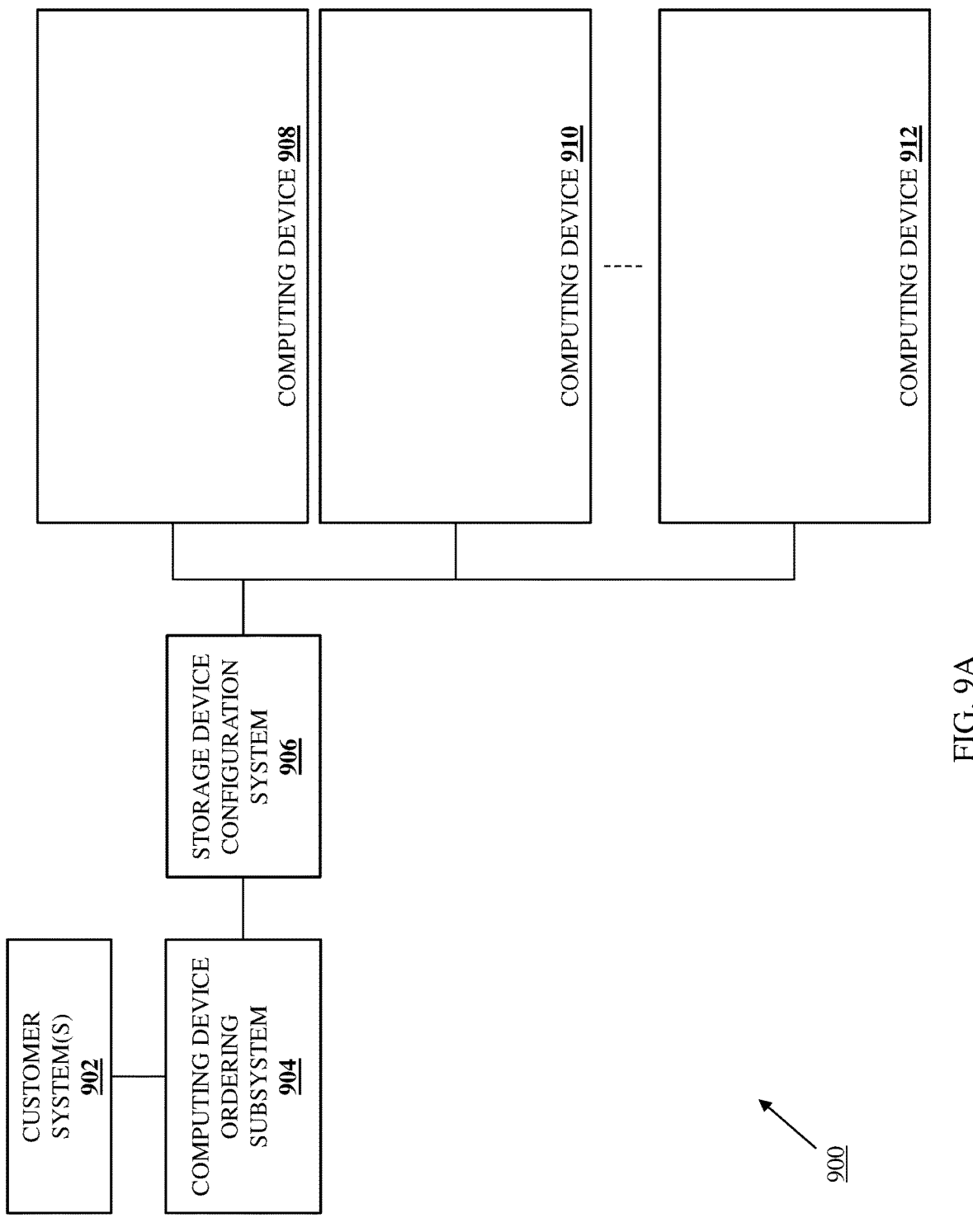
FIG. 9A is a schematic view illustrating an embodiment of the manufacture of computing devices to include components having different personality configurations during the method of FIG. 5.

The method 500 begins at block 502 where a component configuration system identifies one or more computing device orders for one or more computing devices including components. With reference to FIG. 9A, an embodiment of a computing device manufacturing system 900 is illustrated that includes an example of the hardware-type-based multi-component personality configuration system of the present disclosure. As illustrated in FIG. 9A, the computing device manufacturing system 900 includes one or more customer systems 902 that one of skill in the art in possession of the present disclosure will appreciate may include any computing devices and/or other systems that are configured to allow for the ordering of the computing devices that include storage devices as discussed below. The customer system(s) 902 are coupled to a computing device ordering subsystem 904 that may include one or more server devices that are configured to receive orders for the computing devices that include storage devices as discussed below. A storage device configuration system 906 that may be provided by the storage device configuration system 400 of FIG. 4 is coupled to the computing device ordering subsystem 904 and, in this embodiment, provides the example of the hardware-type-based multi-component personality configuration system of the present disclosure. As such, as illustrated in FIG. 9A, the storage device configuration system 906 may be coupled to a plurality of computing devices 908, 910, and up to 912 that, as discussed below, are being manufactured using the computing device manufacturing system 900.

However, while the teachings of the present disclosure are described below as being implemented in a computing device manufacturing system 900 that manufactures computing devices that include the storage devices configured with the personality configuration discussed below, one of skill in the art in possession of the present disclosure will recognize how those teachings may be applied to other storage device provisioning scenarios while remaining within the scope of the present disclosure as well. For example, storage device service providers may operate to provide storage device services for customers that may include, for example, providing replacement storage devices for their computing devices (e.g., to replace a failed storage device with an operating storage device, to replace an "older" storage device with a "newer" storage device, etc.), and the teachings below may be implemented at those storage device service providers to configure any replacement storage device provided to a customer with the personality configurations substantially similarly as described below.

Figure 9B:
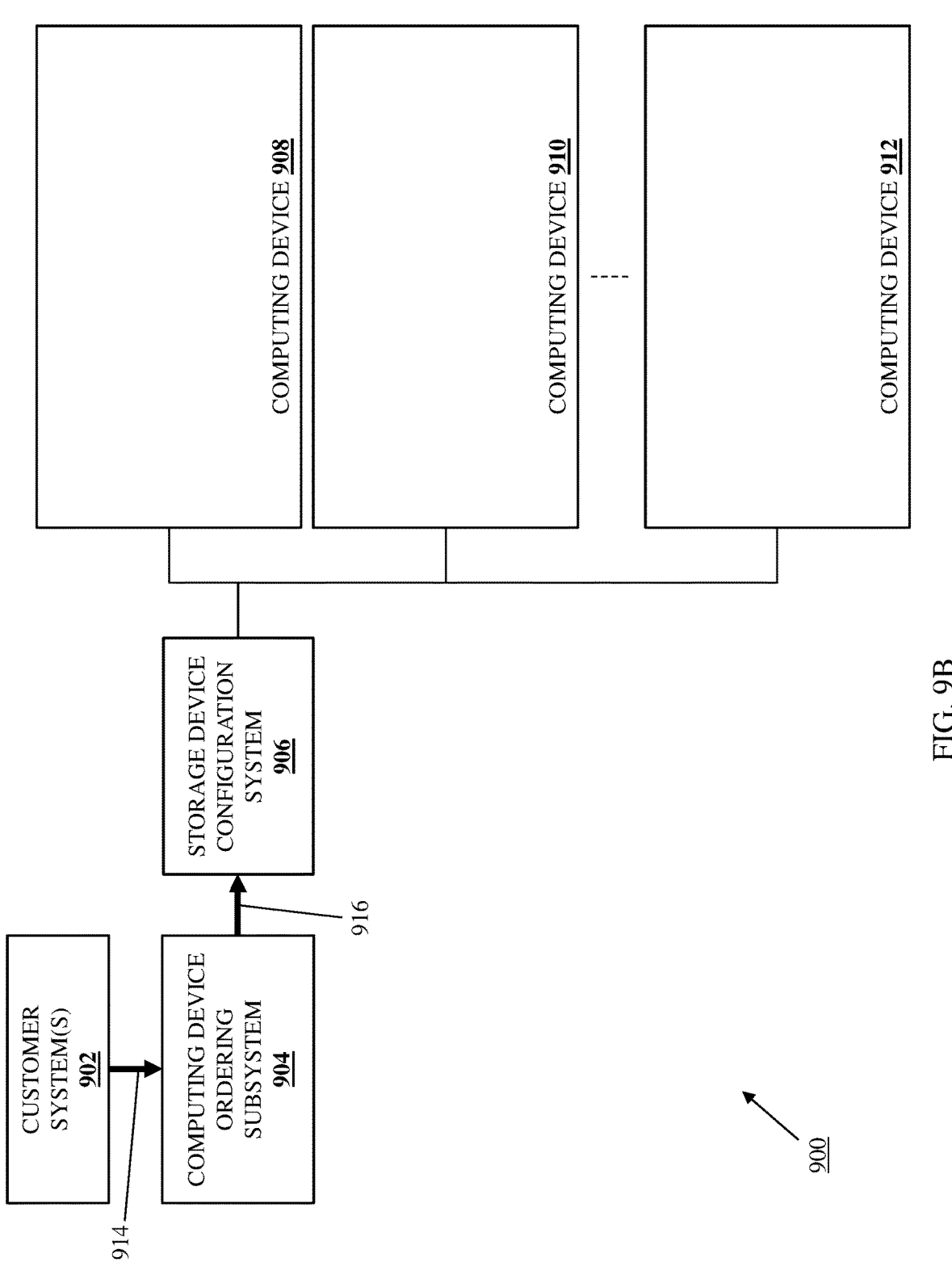
FIG. 9B is a schematic view illustrating an embodiment of the manufacture of computing devices to include components having different personality configurations during the method of FIG. 5.

As illustrated in FIG. 9B, in an embodiment of block 502, the customer system(s) 902 may perform computing device ordering operations 914 that include providing computing device ordering information for one or more computing devices to the computing device ordering subsystem 904. As discussed below, the computing device ordering information may identify storage devices that should be included in the computing devices being ordered, and one of skill in the art in possession of the present disclosure will appreciate how the computing device ordering subsystem 904 may allow the customer system(s) 902 to identify storage devices for inclusion in computing devices being ordered via, for example, a computing device ordering webpage that allows the customers to select storage devices with particular storage device configurations, identify configuration parameters for storage devices, and/or define the configuration of a storage device in any other manner that would be apparent to one of skill in the art in possession of the present disclosure.

In some examples, the storage devices identified in the computing device ordering information may identify a hardware type, firmware type, endurance capabilities, security functionality, and/or other configuration factors for each storage device that should be included in the computing device(s) being ordered (also called a customer "Stock Keeping Unit" (SKU) for that storage device). In other examples, the storage devices identified in the computing device ordering information may define only the hardware type for storage devices that should be included in the computing device(s) being ordered. However, while a few specific examples are provided, one of skill in the art in possession of the present disclosure will appreciate how a variety of storage device configurations (or other component configurations) may be identified in computing device ordering information and may define a variety of storage device features (or other component features) while remaining within the scope of the present disclosure as well. As will be appreciated by one of skill in the art in possession of the present disclosure, the computing device ordering subsystem 904 may store the computing device ordering information received from the customer system(s) 902 using any of a variety of techniques known in the art.

Figure 9C:
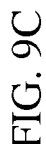
FIG. 9C is a schematic view illustrating an embodiment of the storage device configuration system of FIG. 4 operating during the method of FIG. 5.

With reference to FIGS. 9B and 9C, in an embodiment of block 502, the storage device configuration engine 404 in the storage device configuration system 906/400 may perform computing device ordering information retrieval operations 916 to retrieve the computing device ordering information via its communication system 408 from the computing device ordering subsystem 904. In some embodiments, the storage device configuration engine 404 may then perform computing device ordering information storage operations 918 to store the computing device ordering information in its storage device configuration database 406. As will be appreciated by one of skill in the art in possession of the present disclosure, the computing device ordering information retrieval operations 916 and the computing device ordering information storage operations 918 may be performed more than one time to store a plurality of computing device ordering information in the storage device configuration database 406 in order to allow the storage device configuration engine 404 to use the plurality of computing device ordering information to identify computing device orders for computing devices 908, 910, and up to 912 that include storage device(s), and begin the manufacture of the computing devices 908, 910, and up to 912 that is described below as providing those storage devices in each of those computing devices 908, 910, and up to 912. As such, one of skill in the art in possession of the present disclosure will appreciate how a minimum threshold of computing device ordering information may be collected by the storage device configuration system 906/400 to provide the storage device provisioning efficiencies described below during the computing device manufacturing process.

The method 500 then proceeds to block 504 where the component configuration system determines one or more personality configurations for respective subsets of the components ordered for the computing device(s) that may be provided by particular hardware type components. With reference to FIG. 10, in an embodiment of block 504, the storage device configuration engine 404 in the storage device configuration system 400/906 may perform personality configuration determination operations 1000 that include determining personality configurations for subsets of the components ordered for the computing devices being manufactured according to the computing device orders identified at block 502. As discussed below, embodiments of the present disclosure define a "personality configuration" for components as a configuration of any particular component with particular component functionality that cause that component to perform particular component operations, with that personality configuration locked (e.g., using the one-time-programming techniques described by the inventors of the present disclosure in U.S. patent application Ser. No. 16/863,668, filed on Apr. 30, 2020, the disclosure of which is incorporated by reference herein in its entirety) or otherwise configured such that it may not be easily modified by a customer. As such, in the specific examples below, the personality configurations for the storage devices may be provided and locked for any particular hardware type storage device in order to provide a particular firmware type, particular endurance capabilities, and particular security functionality that cause the corresponding storage device to perform particular storage device firmware type, endurance, and security operations. However, as discussed below, personality configurations may be provided and may be locked for any particular hardware type storage device in order to provide additional storage device functionality (e.g., storage device capacity, storage device sector size, a firmware type configured for temperature-environment-based operation, etc.) while remaining within the scope of the present disclosure as well.

In a specific example, the personality configuration provisioning may include providing at least some storage device functionality that is not locked on the storage device. For example, the storage device sector size described above may be configured using conventional storage device commands, and not using the one-time programmable techniques described above. As such, that storage device sector size may not be "locked" on the storage device, as a software tool or other techniques may be capable of changing the storage device sector size. As such, personality configuration provisioning according to the teachings of the present disclosure may lock some storage device functionality and not other storage device functionality while remaining within the scope of the present disclosure as well.

As such, the personality configuration determination operations 1000 may use the computing device ordering information to identify a hardware type, a firmware type, endurance capabilities, and/or security functionality (as well as other storage device functionality) for each of the storage devices that will be included in the computing devices 908, 910, and up to 912 being manufactured, and then determine subsets of those storage devices that have personality configurations that may be provided by the same storage device hardware type (e.g., one of the hardware type storage devices 802 and 804 in the storage device inventory 800 of FIG. 8). In the specific examples provided below, the personality configuration determination operations 1000 include identifying subsets of the storage devices that have personality configurations that require the same hardware type storage devices, but one of skill in the art in possession of the present disclosure will appreciate how other storage device features (e.g., in addition to hardware type) may be utilized at block 504 to identify the subsets of the storage device while remaining within the scope of the present disclosure as well. As such, in the simplified example provided herein, the personality configuration determination operations 1000 may include identifying a first subset of the storage devices that have been ordered in the computing devices 908-912 being manufactured and that include any combinations of the firmware type, endurance capabilities, and security functionality along with the first hardware type discussed above, and a second subset of the storage devices that have been ordered in the computing devices 908-912 being manufactured and that include any combinations of the firmware type, endurance capabilities, and security functionality along with the second hardware type discussed above.

However, as discussed above, the systems and methods of the present disclosure allow for the manufacture of storage devices without the need to define "full" personality configurations for their components at the time of manufacture, as those "full" personality configurations may be provided to those components after the provisioning of the computing device/components to a customer. For example, the system and methods of the present disclosure may allow a customer to order a computing device with storage devices of a particular hardware type but without defining the firmware type, endurance capabilities, security functionality, and/or other storage device features of those storage devices (e.g., the customer may be presented with different hardware type storage devices during the computing device ordering process, as well as a variety of different possible personality configurations that are available for those different hardware type storage devices and that may be provided once the computing device(s) reach the customer location).

The personality configuration determination operations 1000 may then use the computing device ordering information to identify a hardware type for each of the storage devices that will be included in the computing devices 908, 910, and up to 912 being manufactured, which provides for the determination/grouping of subsets of those storage devices that have personality configurations that may be provided by the same storage device hardware type. As such, in the simplified example provided herein, the personality configuration determination operations 1000 may include identifying a first subset of the storage devices that have been ordered in the computing devices 908-912 being manufactured and that include the first hardware type discussed above, and a second subset of the storage devices that have been ordered in the computing devices 908-912 being manufactured and that include the second hardware type discussed above.

Thus, the different storage device configurations made available to customers by the computing device ordering subsystem 904 may be included in subgroups based on the hardware type storage device required to provide those storage device configurations. For example, using the two hardware type storage device example provided herein, multiple different customer Stock Keeping Units (SKUs) may be merged into two subgroups: a first subgroup that require the first hardware type storage devices, and a second subgroup that require the second hardware type storage devices.

Figure 11A:
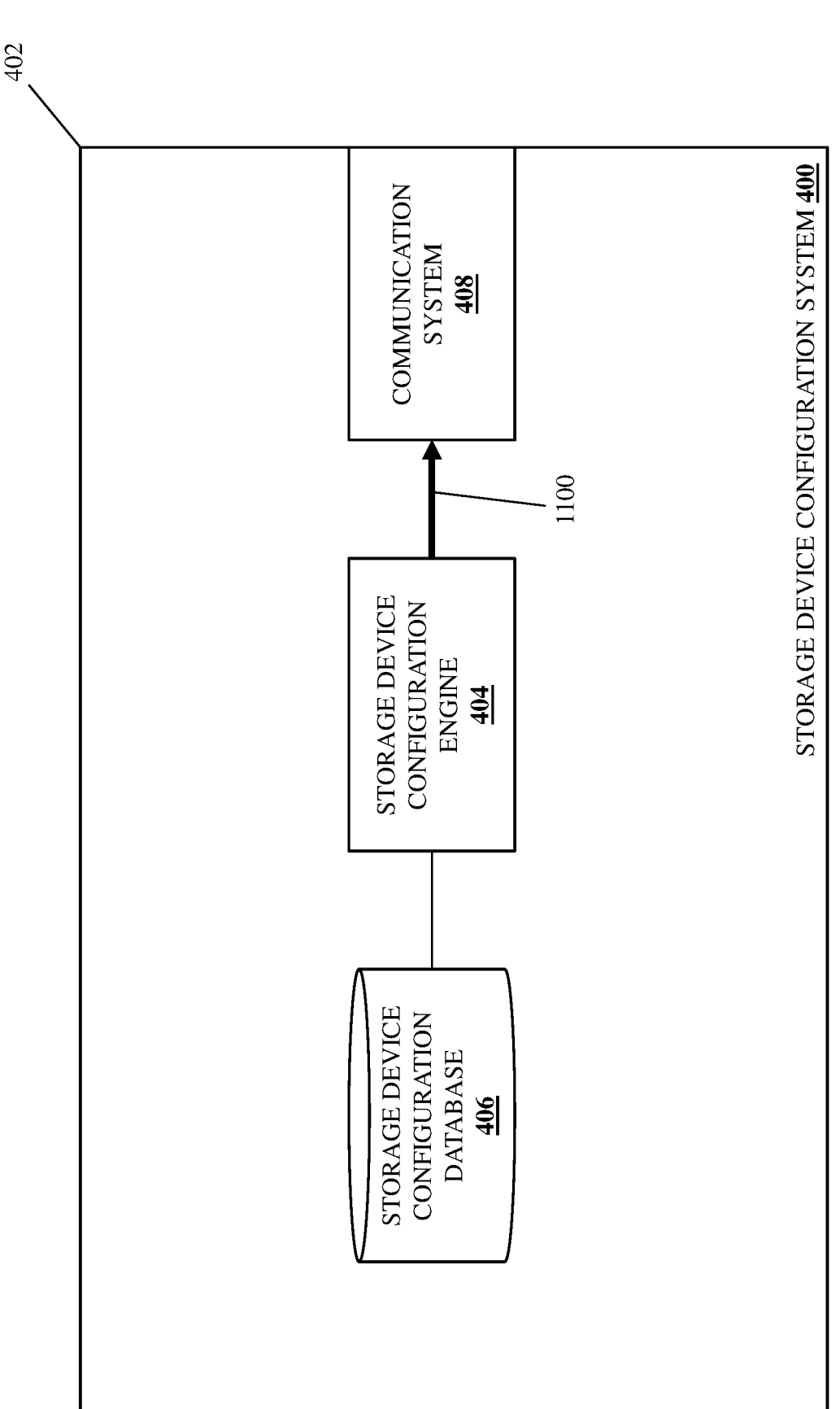
FIG. 11A is a schematic view illustrating an embodiment of the storage device configuration system of FIG. 4 operating during the method of FIG. 5.
Figure 11B:
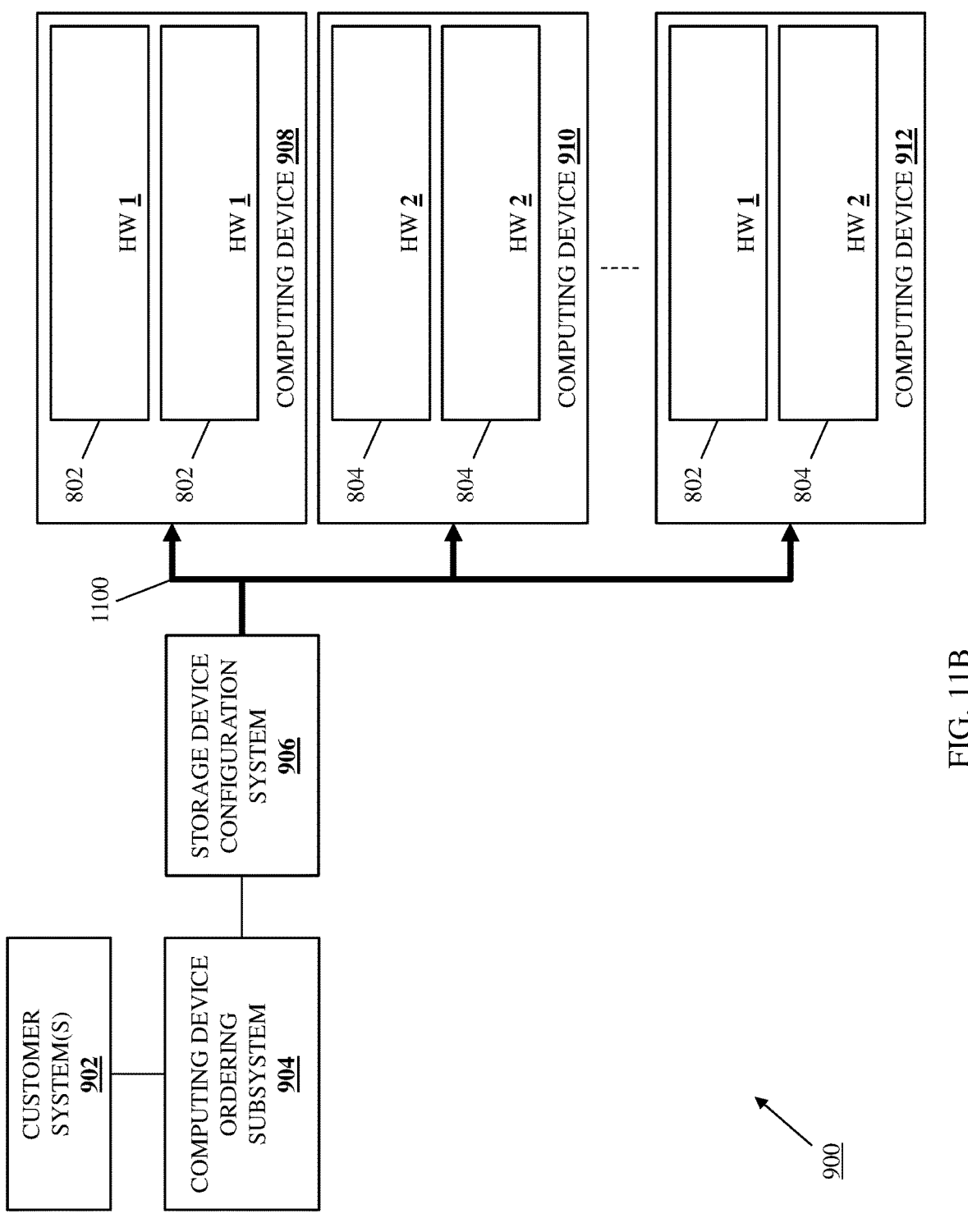
FIG. 11B is a schematic view illustrating an embodiment of the provisioning of components in computing devices during the method of FIG. 5.

The method 500 then proceeds to block 506 where the component configuration system instructs the provisioning of the particular hardware type components in the computing device(s) based on the subsets of components that were ordered for the computing device(s) having personality configuration(s) that are satisfied by those particular hardware type components. With reference to FIGS. 11A and 11B, in an embodiment of block 506, the storage device configuration engine 404 in the storage device configuration system 400/906 may perform hardware type storage device provisioning instruction operations 1100 that instruct the provisioning of storage devices having particular storage device hardware types in the computing devices 908-912. Furthermore, while the hardware type storage device provisioning instructions are illustrated as being transmitted via the communication system 408 in the storage device configuration system 400 and to the computing devices 908-912, one of skill in the art in possession of the present disclosure will appreciate how those hardware type storage device provisioning instructions may be transmitted to a computing device manufacturing subsystem associated with each of those computing devices 908-912 while remaining within the scope of the present disclosure as well.

For example, the hardware type storage device provisioning instruction operations 1100 may include transmitting the hardware type storage device provisioning instructions that instruct the provisioning of storage devices having particular storage device hardware types in the computing devices 908-912 to a computing device manufacturing subsystem for display to computing device manufacturing technicians, which one of skill in the art in possession of the present disclosure will recognize allows the computing device manufacturing technicians to retrieve the storage devices having particular storage device hardware types from the storage device inventory 800, and provide those storage devices in the computing devices 908-912. However, in another example, the hardware type storage device provisioning instruction operations 1100 may include transmitting the hardware type storage device provisioning instructions that instruct the provisioning of storage devices having particular storage device hardware types in the computing devices 908-912 to a computing device manufacturing subsystem that includes an automated subsystem (e.g., robotic computing device manufacturing devices), with the automated subsystem retrieving the storage devices having particular storage device hardware types from the storage device inventory 800 and providing those storage devices in the computing devices 908-912 automatically (e.g., without human intervention) in response to receiving the hardware type storage device provisioning instructions. However, while two specific examples have been described, one of skill in the art in possession of the present disclosure will appreciate how the provisioning of storage devices having particular storage device hardware types in the computing devices may be instructed and executed in other manners that will fall within the scope of the present disclosure as well.

With continued reference to FIG. 11B, and continuing with the specific example provided above, the computing device ordering information for the computing device 908 may identify two storage devices for inclusion in that computing device 908 with personality configuration(s) that may be provided by the storage devices 802 having the first hardware type, the computing device ordering information for the computing device 912 may identify one storage device for inclusion in that computing device 912 with a personality configuration that may be provided by the storage devices 802 having the first hardware type, and one of skill in the art in possession of the present disclosure will appreciate how one or more others of the computing devices being manufactured using the computing device manufacturing system 900 may have personality configuration(s) that may be provided by the storage devices 802 having the first hardware type. As such, as illustrated in FIG. 11B, the hardware type storage device provisioning instruction operations 1100 may result in two of the storage devices 802 having the first hardware type being provided in the computing device 908, one of the storage devices 802 having the first hardware type being provided in the computing device 912, and storage device(s) 802 having the first hardware type being provided in the others of the computing devices that are being manufactured using the computing device manufacturing system 900 and that have been ordered with storage devices having personality configuration(s) that may be provided by the storage devices 802 having the first hardware type.

Similarly, the computing device ordering information for the computing device 910 may identify two storage devices for inclusion in that computing device 910 with personality configuration(s) that may be provided by the storage devices 804 having the second hardware type, the computing device ordering information for the computing device 912 may identify one storage device for inclusion in that computing device 912 with a personality configuration that may be provided by the storage devices 804 having the second hardware type, and one of skill in the art in possession of the present disclosure will appreciate how one or more others of the computing devices being manufactured using the computing device manufacturing system 900 may have personality configuration(s) that may be provided by the storage devices 804 having the second hardware type. As such, as illustrated in FIG. 11B, the hardware type storage device provisioning instruction operations 1100 may result in two of the storage devices 804 having the second hardware type being provided in the computing device 910, one of the storage devices 804 having the second hardware type being provided in the computing device 912, and storage device(s) 804 having the second hardware type being provided in the others of the computing devices that are being manufactured using the computing device manufacturing system 900 and that have been ordered with storage devices having personality configuration(s) that may be provided by the storage devices 804 having the second hardware type.

The method 500 then proceeds to block 508 where the component configuration system configures the particular hardware type components in the computing device(s) to operate according to the personality configuration(s) for the respective subsets of components ordered for the computing device(s). As discussed above, the storage devices provided in the computing devices being manufactured according to the teachings of the present disclosure may be provided with the personality configurations described above either during the manufacture of the computing devices, or at a customer location to which the computing device is provided (e.g., providing personality configurations on storage devices at the customer location may reduce the complexity in the storage device/computing device manufacturing by moving the storage device personality configuration from the computing device manufacturing system to the customer location).

Figure 12A:
FIG. 12A is a schematic view illustrating an embodiment of the storage device configuration system of FIG. 4 operating during the method of FIG. 5.

As such, with reference to FIG. 12A and in some embodiments of block 508, the storage device configuration engine 404 in the storage device configuration system 906/400 may perform personality configuration retrieval operations 1200 to retrieve personality configurations for the storage devices that are provided in the computing devices 908-912 being manufactured. For example, following the storage devices 802 and 804 having been provided in the computing devices 908-912 at block 506 as discussed above, the storage device configuration engine 404 in the storage device configuration system 906/400 may be notified that those storage devices 802 and 804 should be provided with their personality configurations identified in the corresponding computing device ordering information for their computing devices 908-912 and, in response, the storage device configuration engine 404 may retrieve those personality configurations. However, while a specific example of the retrieval of personality configurations has been described, one of skill in the art in possession of the present disclosure will appreciate how personality configurations may be retrieved for storage devices in other manners that will fall within the scope of the present disclosure as well.

Figure 12B:
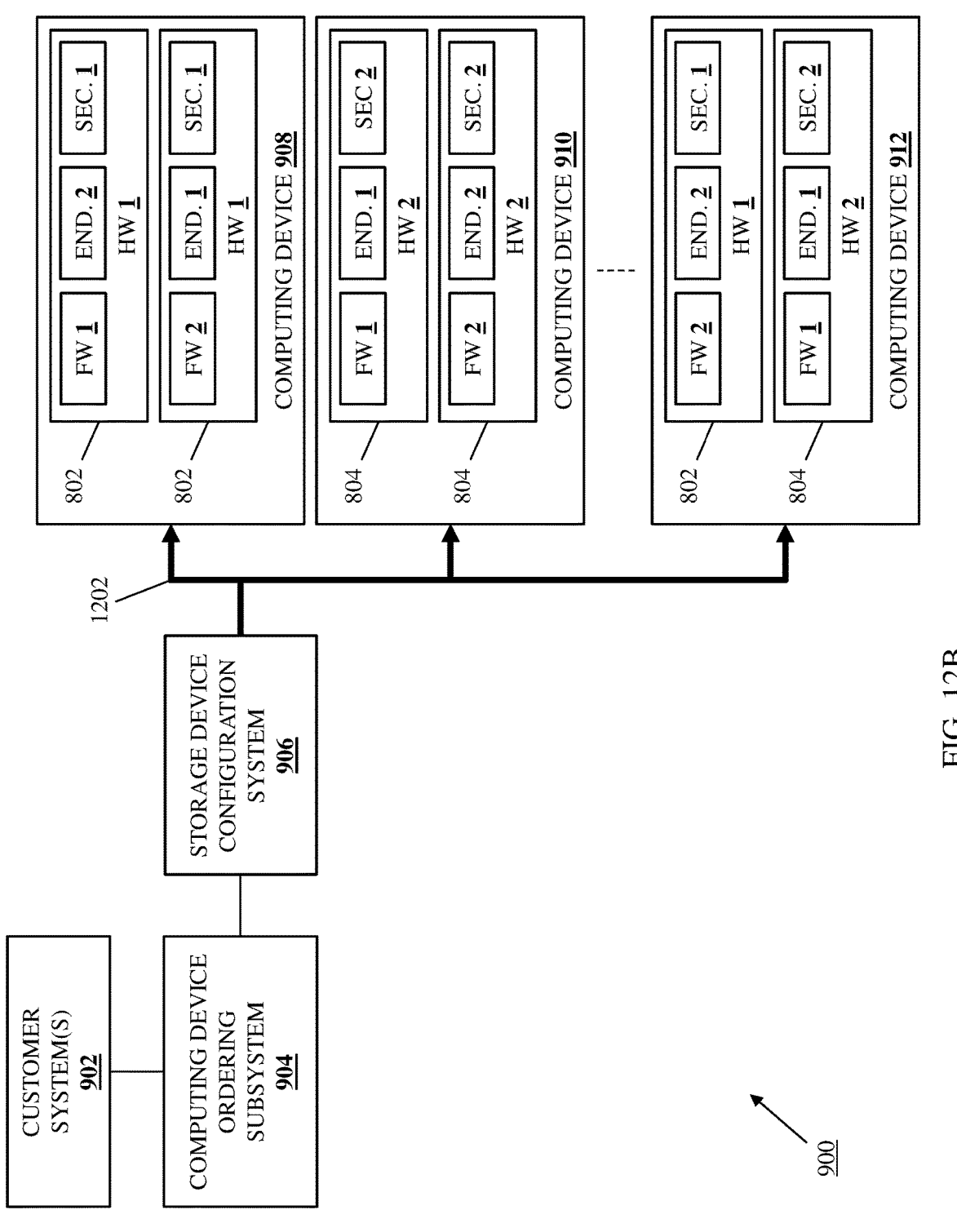
FIG. 12B is a schematic view illustrating an embodiment of the provisioning of personality configurations in components in computing devices during the method of FIG. 5.

With reference to FIGS. 12A, 12B, and 12C, and in these embodiments of block 508, the storage device configuration engine 404 in the storage device configuration system 906/400 may then perform personality configuration operations 1202 via its communication system 408 with each of the storage devices 802 and 804 that were provided in the computing devices 908-912 at block 506. Furthermore, FIG. 12C illustrates how, for any storage device 300, those personality configuration operations 1202 may include the provisioning of a personality configuration 1204 via the communication system 310 (and the storage processing system 304 in the example illustrated in FIG. 12C) and in the storage memory system 306 of that storage device 300.

In the simplified examples below, the personality configuration for a storage device include a first or second firmware type (e.g., a "channel"/industry standard firmware type or a computing-device-manufacturer unique firmware type), first or second endurance capabilities (e.g., 1 Write Per Day (WPD) or 3 WPD), and first or second security functionality (e.g., security-locking-capable security functionality to allow data on the storage device to be encrypted or security-locking-incapable security functionality that prevents data on the storage device from being encrypted (and that may be required by some countries, governments, and/or jurisdictions that do not allow the import, sale, or use of security-locking capable storage devices)). However, one of skill in the art in possession of the present disclosure will appreciate how the personality configurations discussed below may provide different/more storage device features/functionality while remaining within the scope of the present disclosure as well.

The specific example provided in FIG. 12B illustrates how the personality configuration 1204 provided for one of the storage devices 300/802 with the first hardware type ("HW1") in the computing device 908 may include any information or data that provides the first firmware type ("FW 1"), second endurance capabilities ("END. 2"), and first security functionality ("SEC. 1") for that storage device 300/802, which one of skill in the art in possession of the present disclosure will appreciate provides that storage device with the same configuration as the storage device 604 provided in the conventional computing device manufacturing system 700 discussed above with reference to FIG. 7B. Similarly, the personality configuration 1204 provided for the other of the storage devices 300/802 with the first hardware type ("HW1") in the computing device 908 may include any information or data that provides the second firmware type ("FW 2"), first endurance capabilities ("END. 1"), and the first security functionality ("SEC. 1") for that storage device 300/802, which one of skill in the art in possession of the present disclosure will appreciate provides that storage device with the same configuration as the storage device 610 provided in the conventional computing device manufacturing system 700 discussed above with reference to FIG. 7B.

Similarly, the personality configuration 1204 provided for one of the storage devices 300/804 with the second hardware type ("HW2") in the computing device 910 may include any information or data that provides the first firmware type ("FW 1"), the first endurance capabilities ("END. 1"), and second security functionality ("SEC. 2") for that storage device 300/804, which one of skill in the art in possession of the present disclosure will appreciate provides that storage device with the same configuration as the storage device 622 provided in the conventional computing device manufacturing system 700 discussed above with reference to FIG. 7B. Similarly, the personality configuration 1204 provided for the other of the storage devices 300/804 with the second hardware type ("HW2") in the computing device 910 may include any information or data that provides the second firmware type ("FW 2"), the second endurance capabilities ("END. 2"), and the second security functionality ("SEC. 2") for that storage device 300/804, which one of skill in the art in possession of the present disclosure will appreciate provides that storage device with the same configuration as the storage device 632 provided in the conventional computing device manufacturing system 700 discussed above with reference to FIG. 7B.

Similarly, the personality configuration 1204 provided for the storage device 300/802 with the first hardware type ("HW1") in the computing device 912 may include any information or data that provides the second firmware type ("FW 2"), the second endurance capabilities ("END. 2"), and first security functionality ("SEC. 1") for that storage device 300/802, which one of skill in the art in possession of the present disclosure will appreciate provides that storage device with the same configuration as the storage device 612 provided in the conventional computing device manufacturing system 700 discussed above with reference to FIG. 7B. Similarly, the personality configuration 1204 provided for the storage devices 300/804 with the second hardware type ("HW2") in the computing device 912 may include any information or data that provides the first firmware type ("FW 1"), the first endurance capabilities ("END. 1"), and the second security functionality ("SEC. 2") for that storage device 300/804, which one of skill in the art in possession of the present disclosure will appreciate provides that storage device with the same configuration as the storage device 628 provided in the conventional computing device manufacturing system 700 discussed above with reference to FIG. 7B. As will be appreciated by one of skill in the art in possession of the present disclosure, following the provisioning of personality configurations on the storage devices in the computing devices 908-912 at block 508, the personality configurations of the storage devices may be locked (e.g., using the one-time-programming techniques described by the inventors of the present disclosure in U.S. patent application Ser. No. 16/863,668, filed on Apr. 30, 2020, the disclosure of which is incorporated by reference herein in its entirety), and the computing devices may be provided (e.g., shipped, picked, delivered, etc.) to the customer(s) that ordered them.

Figure 13A:
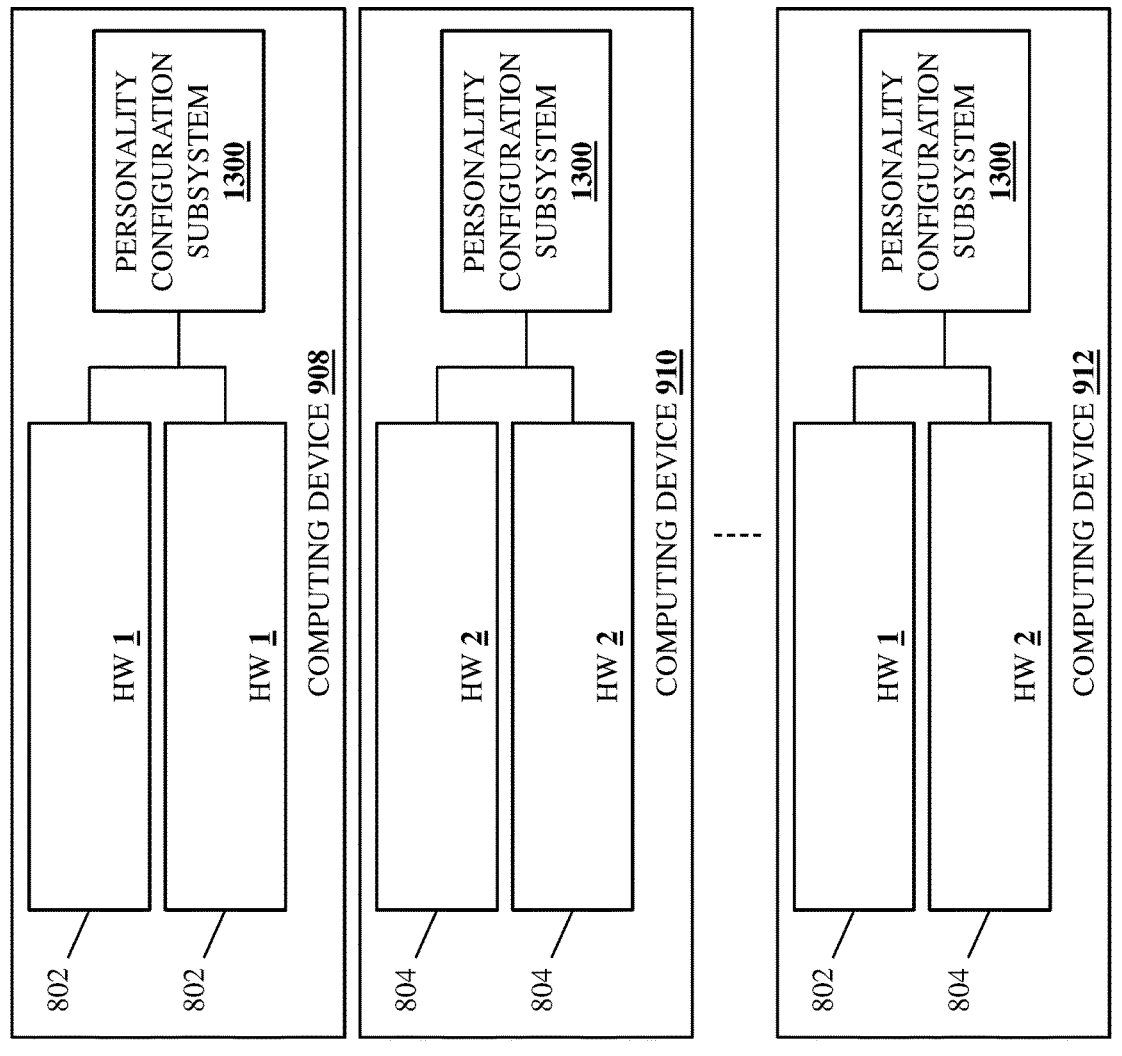
FIG. 13A is a schematic view illustrating an embodiment of the provisioning of components in computing devices during the method of FIG. 5.

With reference now to FIG. 13A and in other embodiments of block 508, the storage device configuration engine 404 in the storage device configuration system 906/400 may provide a personality configuration subsystem 1300 in each of the computing devices 908-912 being manufactured, with that personality configuration subsystem 1300 coupled to the storage devices provided in that computing device. As will be appreciated by one of skill in the art in possession of the present disclosure, the personality configuration subsystem 1300 may include any components, devices, subsystems, information, data, and/or other elements that would allow for the functionality of the personality configuration subsystems 1300 discussed below. For example, in some embodiments, the computing device ordering information for each of the computing devices 908-912 may identify the configurations of the storage devices included therein, and thus the storage device configuration engine 404 may provide may retrieve and provide the personality configurations required for those storage devices (e.g., the information or data required to provide those personality configurations on those storage devices as discussed below) in the personality configuration subsystem 1300 included in their computing device. However, in other examples the computing device ordering information for each of the computing devices 908-912 may only identify the hardware types of the storage devices included therein, and thus the personality configuration subsystem 1300 may not include the personality configurations required for those storage devices.

Figure 13B:
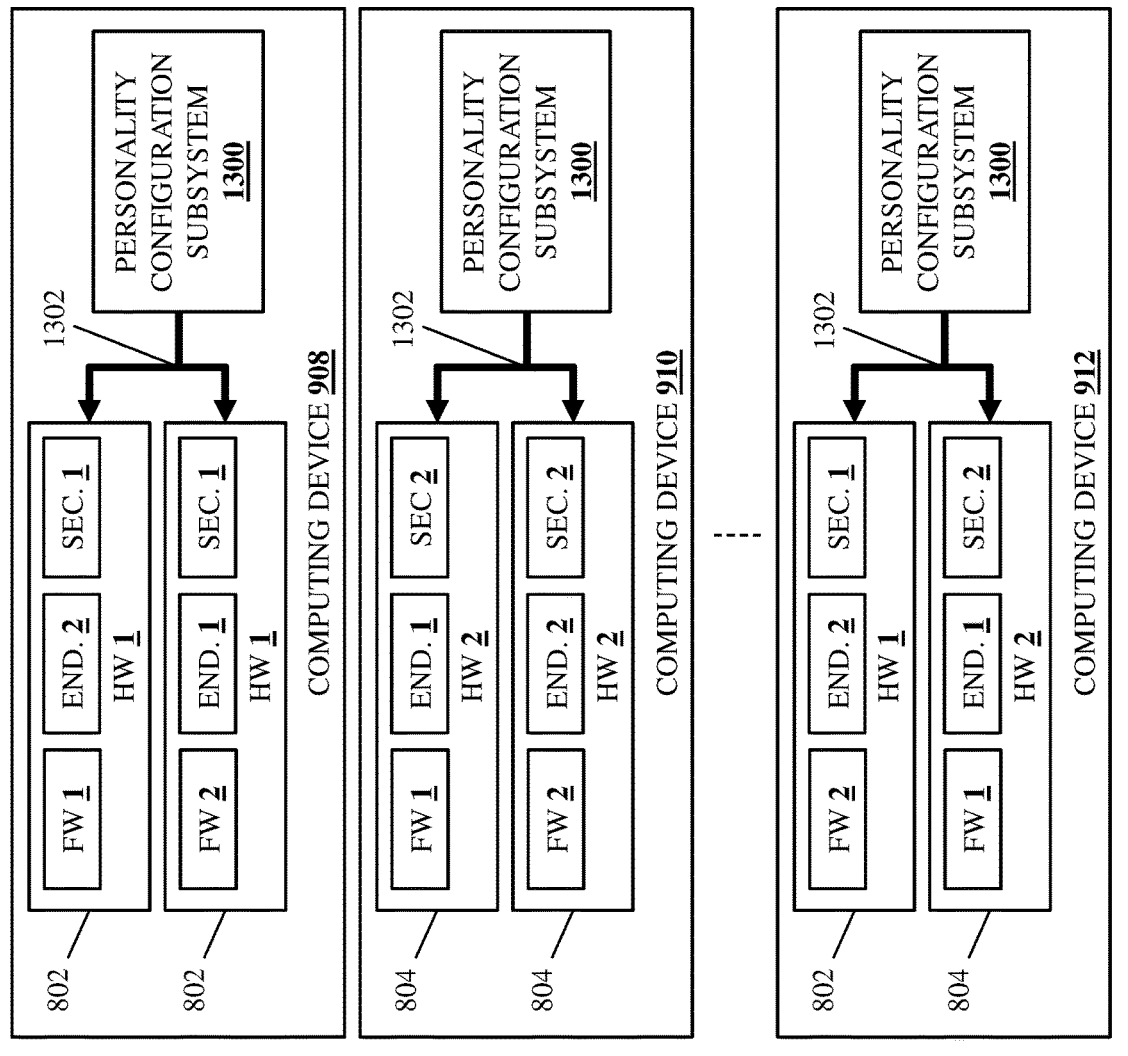
FIG. 13B is a schematic view illustrating an embodiment of the provisioning of personality configurations in computing devices during the method of FIG. 5.

In an embodiment, following the provisioning of the personality configuration subsystem 1300 in each of the computing devices 908-912, those computing devices 908-912 may be provided (e.g., shipped, picked up, delivered, etc.) to the customer(s) that ordered them such that those customer(s) receive those computing devices 908-912 with the storage devices that have not been provided with personality configurations. With reference to FIG. 13B, in response to receiving the computing devices 908-912, the customer(s) may activate the personality configuration subsystem 1300 in that computing device to cause them to perform personality configuration operations 1302 that configure the storage devices included therein. FIG. 13C illustrates how, for any storage device 300, the personality configuration operations 1302 may include the provisioning of a personality configuration 1304 via the communication system 310 (and the storage processing system 304 in the example illustrated in FIG. 13C) and in the storage memory system 306 of that storage device 300.

As will be appreciated by one of skill in the art in possession of the present disclosure, the personality configuration subsystem 1300 may be configured to determine that an operating system has been configured on its computing device (e.g., the computing device has booted, reset, and/or otherwise initialized such that it enters a runtime state controlled by an operating system provided by the computing engine 2004) and, in response, configure the storage devices included in that computing device with their respective personality configuration. As such, personality configuration provisioning on storage devices that requires a functioning operating system may be performed after that operating system has been configured on that computing device at the customer location. In some embodiments, the personality configuration operations 1302 may include the personality configuration subsystems 1300 in each computing device 908-912 using the personality configurations that were included in those personality configuration subsystems 1300 to configure the storage devices included in those computing devices 908-912.

In other embodiments, the personality configuration operations 1302 may include the personality configuration subsystems 1300 in each computing device 908-912 using a network (e.g., the Internet) to retrieve personality configurations to configure the storage devices included in those computing devices 908-912. For example, the personality configuration subsystems 1300 in each computing device 908-912 may use the network (e.g., the Internet) to connect to the computing device manufacturing system 900, identify the computing device in which they're located to retrieve personality configuration(s) for the storage devices included in that computing device, and configure the storage devices included in that computing device using those personality configuration(s).

In another example, the personality configuration subsystems 1300 in each computing device 908-912 may be configured to allow a customer to define (e.g., via a "personality configuration wizard", Graphical User Interface (GUI), and/or other software functionality) the personality configuration for each storage device in that computing device, and then retrieve the personality configuration(s) defined for those storage devices via the network and use them to configure those storage devices. As such, a customer may order computing device(s) with storage device hardware types, and then may later define the personality configurations for those storage devices at the customer location. However, while several specific examples have been provided, one of skill in the art in possession of the present disclosure will appreciate how personality configurations may be retrieved using other techniques that will fall within the scope of the present disclosure as well.

The specific example provided in FIG. 13B illustrates how the personality configuration 1304 provided for one of the storage devices 300/802 with the first hardware type ("HW1") in the computing device 908 may include any information or data that provides the first firmware type ("FW 1"), second endurance capabilities ("END. 2"), and first security functionality ("SEC. 1") for that storage device 300/802, which one of skill in the art in possession of the present disclosure will appreciate provides that storage device with the same configuration as the storage device 604 provided in the conventional computing device manufacturing system 700 discussed above with reference to FIG. 7B. Similarly, the personality configuration 1304 provided for the other of the storage devices 300/802 with the first hardware type ("HW1") in the computing device 908 may include any information or data that provides the second firmware type ("FW 2"), first endurance capabilities ("END. 1"), and the first security functionality ("SEC. 1") for that storage device 300/802, which one of skill in the art in possession of the present disclosure will appreciate provides that storage device with the same configuration as the storage device 610 provided in the conventional computing device manufacturing system 700 discussed above with reference to FIG. 7B.

Similarly, the personality configuration 1304 provided for one of the storage devices 300/804 with the second hardware type ("HW2") in the computing device 910 may include any information or data that provides the first firmware type ("FW 1"), the first endurance capabilities ("END. 1"), and second security functionality ("SEC. 2") for that storage device 300/804, which one of skill in the art in possession of the present disclosure will appreciate provides that storage device with the same configuration as the storage device 622 provided in the conventional computing device manufacturing system 700 discussed above with reference to FIG. 7B. Similarly, the personality configuration 1304 provided for the other of the storage devices 300/802 with the second hardware type ("HW2") in the computing device 910 may include any information or data that provides the second firmware type ("FW 2"), the second endurance capabilities ("END. 2"), and the second security functionality ("SEC. 2") for that storage device 300/802, which one of skill in the art in possession of the present disclosure will appreciate provides that storage device with the same configuration as the storage device 632 provided in the conventional computing device manufacturing system 700 discussed above with reference to FIG. 7B.

Similarly, the personality configuration 1304 provided for the storage device 300/802 with the first hardware type ("HW1") in the computing device 912 may include any information or data that provides the second firmware type ("FW 2"), the second endurance capabilities ("END. 2"), and first security functionality ("SEC. 1") for that storage device 300/802, which one of skill in the art in possession of the present disclosure will appreciate provides that storage device with the same configuration as the storage device 612 provided in the conventional computing device manufacturing system 700 discussed above with reference to FIG. 7B. Similarly, the personality configuration 1304 provided for the storage device 300/804 with the second hardware type ("HW2") in the computing device 912 may include any information or data that provides the first firmware type ("FW 1"), the first endurance capabilities ("END. 1"), and the second security functionality ("SEC. 2") for that storage device 300/804, which one of skill in the art in possession of the present disclosure will appreciate provides that storage device with the same configuration as the storage device 628 provided in the conventional computing device manufacturing system 700 discussed above with reference to FIG. 7B. As will be appreciated by one of skill in the art in possession of the present disclosure, following the provisioning of the personality configurations on the storage devices by the personality configuration subsystems 1300 as discussed above, the personality configuration subsystems may lock those personality configurations on those storage devices (e.g., using the one-time-programming techniques described by the inventors of the present disclosure in U.S. patent application Ser. No. 16/863,668, filed on Apr. 30, 2020, the disclosure of which is incorporated by reference herein in its entirety).

While the storage device/component personality configuration at the customer location is described in detail above as being performed upon the initial receipt of the computing device and following the manufacture of the computing device, one of skill in the art in possession of the present disclosure will appreciate how the storage device/component personality configuration at the customer location may be performed on one or more storage device(s)/components in other situations as well. For example, in the event a storage device/component in the computing device is replaced (e.g., in cooperation with the computing device service system discussed above), the replacement storage device/component may be sent to the customer, provided in the computing device (i.e., in place of the replaced storage device/component), and provided and locked with a personality configuration in substantially the same manner as described above. Furthermore, in some embodiments, the personality configuration subsystem 1300 may be configured to automatically identify the replacement storage device/component provided in the computing device in place of the replaced storage device/component, retrieve the personality configuration of that replaced storage device/component, and provide and lock that personality configuration on the replacement storage device/component in substantially the same manner as described above without the need for customer intervention (i.e., other than to provide the replacement storage device/component in the computing device).

In the examples above, each of the different hardware type storage devices are described as being provided in the computing devices without any personality configuration, and then being configured with a personality configuration as per the computing device ordering information for those computing devices, and one of skill in the art in possession of the present disclosure will appreciate how implementation of such examples may include the provisioning of "boot loader" or similar software on the storage devices that provides for the communications capabilities needed in order to enable the provisioning of personality configurations discussed above on those storage devices. However, in other embodiments, the different hardware type storage devices may be configured with the most common personality configuration (e.g., the personality configuration most often ordered for that hardware type storage device) before provisioning in the storage device inventory 800, which allows those storage devices to be provided in computing devices without the need to perform the personality configuration operations discussed above if those storage devices were ordered with that most common personality configuration, while simply requiring the performance of the personality configuration operations as discussed above if those storage devices were ordered with a different personality configuration.

While the storage device personality configuration discussed above is illustrated and described as being performed at the computing device manufacturing system, computing device service system, or at the customer location, one of skill in the art in possession of the present disclosure will appreciate how the provisioning of at least portions of the personality configurations on the storage devices as discussed above may be performed at any combination of the computing device manufacturing system, computing device service system, and/or the customer location.

For example, as discussed above, portions of the personality configuration for storage device such as the security functionality may be subject to requirements of countries, governments, and/or jurisdictions, and thus configuration may be required before those storage devices are sent to customer locations in those countries/jurisdictions and/or subject to those governments. As such, for countries, governments, and/or jurisdictions that do not allow the import, sale, or use of security-locking capable storage devices, storage devices may be provided and locked with a portion of their personality configuration at the computing device manufacturer system 900 that configures those storage devices with security-locking-incapable security functionality that prevents data on the storage device from being encrypted, while allowing the remaining portions of the personality configuration for those storage devices to be provided and locked at the customer location.

Furthermore, while the storage device personality configuration discussed above as being performed at the customer location is only described as being performed to provide an initial configuration, one of skill in the art in possession of the present disclosure will appreciate how the teachings of the present disclosure may be applied to reconfigure a storage device with a second personality configuration after that storage device was previously provided with a first personality configuration that is different than the second personality configuration. For example, a storage device may have been provided and locked with the first personality configuration by the computing device manufacturing system 900 (or at the customer location) substantially similarly as described above, and then may be unlocked (e.g., using the one-time-programming-undo techniques described by some of the inventors of the present disclosure in U.S. patent application Ser. No. 17/942,855, filed on Sep. 12, 2022, the disclosure of which is incorporated by reference herein in its entirety), provided with a second personality configuration at the customer location substantially similarly as described above, and then locked (e.g., using the one-time-programming techniques described by the inventors of the present disclosure in U.S. patent application Ser. No. 16/863,668, filed on Apr. 30, 2020, the disclosure of which is incorporated by reference herein in its entirety).

Thus, systems and methods have been described that provide for the manufacture of computing devices with storage devices in a manner that reduces the variety of stock/inventory of storage devices that is required, with the examples above reducing the stock/inventory of 16 different configurations of storage devices to 2 different hardware types of storage devices while maintaining the ability to provide the same number of storage device configurations that include different firmware types, different endurance capabilities, and different security functionality. Furthermore, one of skill in the art in possession of the present disclosure will appreciate how additional storage device configurations may be provided using the 2 different hardware types of storage devices provided in the examples above by, for example, providing personality configurations that configure the storage devices for different temperature-based operation (e.g., for operation in a datacenter environment with relatively narrow ambient temperature ranges of 10 C-35 C, or for operation in a telecommunications environment with relatively wide temperature ranges of 0 C-55 C), different storage device capacities, different storage device sector sizes, as well as a variety of other personality configuration factors that would be apparent to one of skill in the art in possession of the present disclosure. As such, one of skill in the art in possession of the present disclosure will appreciate how real-world implementations of the teachings of the present disclosure may allow many more storage device configurations to be made available to customers relative to conventional computing device manufacturing systems by, for example, increasing the number of different hardware type storage devices that are stocked (e.g., by providing 20 different hardware type storage devices in the storage device inventory 900).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A hardware-type-based multi-component personality configuration system, comprising:
   a first component stock that includes a plurality of first hardware type components each having a first hardware type;
   a second component stock that includes a plurality of second hardware type components each having a second hardware type that is different than the first hardware type; and
   a component configuration system that is configured to:
      identify a plurality of computing device orders for a plurality of computing devices, wherein the plurality of computing device orders identify components for inclusion in the plurality of computing devices, and a respective personality configuration for each of the components that defines firmware used by that component, capabilities of that component, and functionality available from that component;
      determine 1) that the respective personality configurations for each of a first plurality of the components identified for inclusion in a first subset of the plurality of computing devices may be provided using the first hardware type of the plurality of first hardware type components, and 2) that the respective personality configurations for each of a second plurality of the components identified for inclusion in a second subset of the plurality of computing devices may be provided using the second hardware type of the plurality of second hardware type components;
      instruct 1) the provisioning of at least one of the plurality of first hardware type components in each of the first subset of the plurality of computing devices such that the at least one of the plurality of first hardware type components is provided in each of the first subset of the plurality of computing devices, and 2) the provisioning of at least one of the plurality of second hardware type components in each of the second subset of the plurality of computing devices such that the at least one of the plurality of second hardware type components is provided in each of the second subset of the plurality of computing devices;

configure 1) each of the at least one of the plurality of first hardware type components that were provided in each of the first subset of the plurality of computing devices to operate according to the respective personality configuration for a respective one of the components that was identified in a respective one of the plurality of computing device orders for that computing device by configuring that first hardware type component with firmware, capabilities, and functionality identified in that personality configuration, and 2) each of the at least one of the plurality of second hardware type components that were provided in each of the second subset of the plurality of computing devices to operate according to the respective personality configuration for a respective one of the components that was identified in a respective one of the plurality of computing device orders for that computing device by configuring that second hardware type component with firmware, capabilities, and functionality identified in that personality configuration; and lock 1) the respective personality configuration that was configured for each of the plurality of first hardware type components that were provided in the first subset of the plurality of computing devices, and 2) the respective personality configuration that was configured for each of the plurality of second hardware type components that were provided in the second subset of the plurality of computing devices.

2. The system of claim 1, wherein the configuring each of the at least one of the plurality of first hardware type components that were provided in each of the first subset of the plurality of computing devices to operate according to the respective personality configuration for the respective one of the components that was identified in the respective one of the plurality of computing device orders for that computing device by configuring that first hardware type component with firmware, capabilities, and functionality identified in that personality configuration includes:

configuring each of the at least one of the plurality of first hardware type components that were provided in each of the first subset of the plurality of computing devices with the respective personality configuration for a respective one of the first subset of the plurality of components that was identified in a respective one of the plurality of computing device orders for that computing device by configuring that first hardware type component with firmware, capabilities, and functionality identified in that personality configuration.

3. The system of claim 1, wherein the configuring each of the at least one of the plurality of first hardware type components that were provided in each of the first subset of the plurality of computing devices to operate according to the respective personality configuration for the respective one of the components that was identified in the respective one of the plurality of computing device orders for that computing device by configuring that first hardware type component with firmware, capabilities, and functionality identified in that personality configuration includes:

configuring each of the first subset of the plurality of computing devices to configure the first hardware type component provided in that computing device with the respective personality configuration for the respective one of the first subset of the plurality of components that was identified in the respective one of the plurality of computing device orders for that computing device by configuring that first hardware type component with firmware, capabilities, and functionality identified in that personality configuration.

4. The system of claim 1, wherein the first hardware type components and the second hardware type components are storage devices.

5. The system of claim 4, wherein each respective personality configuration defines endurance capabilities and security functionality for the storage device for which that respective personality configuration was provided.

6. An Information Handling System (IHS), comprising:
a processing system; and
a memory system that is coupled to the processing system and that includes instructions that, when executed by the processing system, cause the processing system to provide a component configuration engine that is configured to:

identify a plurality of computing device orders for a plurality of computing devices, wherein the plurality of computing device orders identify components for inclusion in the plurality of computing devices, and a respective personality configuration for each of the components that defines firmware used by that component, capabilities of that component, and functionality available from that component;

determine 1) that the respective personality configurations for each of a first plurality of the components identified for inclusion in a first subset of the plurality of computing devices may be providedusing a first hardware type of a plurality of first hardware type components that are included in a first component stock, and 2) that the respective personality configurations for each of a second plurality of the components identified for inclusion in a second subset of the plurality of computing devicesmay be provided using a second hardware type of a plurality of second hardware type components that are included in a second component stock;

instruct 1) the provisioning of at least one of the plurality of first hardware type components in each of the first subset of the plurality of computing devices such that the at least one of the plurality of first hardware type components is provided in each of the first subset of the plurality of computing devices, and 2) the provisioning of at least one of the plurality of second hardware type components in each of the second subset of the plurality of computing devices such that the at least one of the plurality of second hardware type components is provided in each of the second subset of the plurality of computing devices;

configure 1) each of the at least one of the plurality of first hardware type components that were provided in each of the first subset of the plurality of computing devices to operate according to the respective personality configuration for a respective one of the components that was identified in a respective one of the plurality of computing device orders for that computing device by configuring that first hardware type component with firmware, capabilities, and functionality identified in that personality configuration, and 2) each of the at least one of the plurality of second hardware type components that were provided in each of the second subset of the plurality of computing devices to operate according to the respective personality configuration for a respective one of the components that was identified in a respective one of the plurality of computing device orders for that computing device by configuring that second hardware type component with firmware, capabilities, and functionality identified in that personality configuration; and lock 1) the respective personality configuration that was configured for each of the plurality of first hardware type components that were provided in the first subset of the plurality of computing devices, and 2) the respective personality configuration that was configured for each of the plurality of second hardware type components that were provided in the second subset of the plurality of computing devices.

7. The IHS of claim 6, wherein the configuring each of the at least one of the plurality of first hardware type components that were provided in each of the first subset of the plurality of computing devices to operate according to the respective personality configuration for the respective one of the components that was identified in the respective one of the plurality of computing device orders for that computing device by configuring that first hardware type component with firmware, capabilities, and functionality identified in that personality configuration includes:

configuring each of the at least one of the plurality of first hardware type components that were provided in each of the first subset of the plurality of computing devices with the respective personality configuration for a respective one of the first subset of the plurality of components that was identified in a respective one of the plurality of computing device orders for that computing device by configuring that first hardware type component with firmware, capabilities, and functionality identified in that personality configuration.

8. The IHS of claim 6, wherein the configuring each of the at least one of the plurality of first hardware type components that were provided in each of the first subset of the plurality of computing devices to operate according to the respective personality configuration for the respective one of the components that was identified in the respective one of the plurality of computing device orders for that computing device by configuring that first hardware type component with firmware, capabilities, and functionality identified in that personality configuration includes:

configuring each of the first subset of the plurality of computing devices to configure the first hardware type component provided in that computing device with the respective personality configuration for the respective one of the first subset of the plurality of components that was identified in the respective one of the plurality of computing device orders for that computing device by configuring that first hardware type component with firmware, capabilities, and functionality identified in that personality configuration.

9. The IHS of claim 8, wherein the configuring each of the first subset of the plurality of computing devices to configure the first hardware type component provided in that computing device with the respective personality configuration for the respective one of the first subset of the plurality of components that was identified in the respective one of the plurality of computing device orders for that computing device by configuring that first hardware type component with firmware, capabilities, and functionality identified in that personality configuration includes:

configuring each of the first subset of the plurality of computing devices to determine that an operating system has been configured on that computing device and, in response, configure the first hardware type component provided in that computing device with the respective personality configuration for a the respective one of the first subset of the plurality of components that was identified in a the respective one of the plurality of computing device orders for that computing device by configuring that first hardware type component with firmware, capabilities, and functionality identified in that personality configuration.

10. The IHS of claim 6, wherein the first hardware type components are storage devices.

11. The IHS of claim 10, wherein each respective personality configuration defines endurance capabilities and security configuration functionality for the storage device for which that respective personality configuration was provided.

12. A method for configuring multiple components based on hardware types, comprising:

identifying, by a component configuration system, a plurality of computing device orders for a plurality of computing devices, wherein the plurality of computing device orders identify components for inclusion in the plurality of computing devices, and a respective personality configuration for each of the components that defines firmware used by that component, capabilities of that component, and functionality available from that component;

determining, by the component configuration system, 1) that the respective personality configurations for each of a first plurality of the components identified for inclusion in a first subset of the plurality of computing devices may be provided using a first hardware type of a plurality of first hardware type components that are included in a first component stock, and 2) that the respective personality configurations for each of a second plurality of the components identified for inclusion in a second subset of the plurality of computing devices may be provided using a second hardware type of a plurality of second hardware type components that are included in a second component stock;

instructing, by the component configuration system, 1) the provisioning of at least one of the plurality of first hardware type components in each of the first subset of the plurality of computing devicesuch that the atleast one of the plurality of first hardware type components is provided in each of the first subset of the plurality of computing devices, and 2) the provisioning of at least one of the plurality of second hardware type components in each of the second subset of the plurality of computing devices such that the at least one of the plurality of second hardware type components is provided in each of the second subset of the plurality of computing devices;

configuring, by the component configuration system, 1) each of the at least one of the plurality of first hardware type components that were provided in each of the first subset of the plurality of computing devices to operate according to the respective personality configuration for a respective one of the components that was identified in a respective one of the plurality of computing device orders for that computing device by configuring that first hardware type component with firmware, capabilities, and functionality identifiedin that personality configuration, and 2) each of the at least one of the plurality of second hardware type components that were provided in each of the second subset of the plurality of computing devices to operate according to the respective personality configuration for a respective one of the components that was identified in a respective one of the plurality of computing device orders for that computing device by configuring that second hardware type component with firmware, capabilities, and functionality identified in that personality configuration; and locking, by the component configuration system, 1) the respective personality configuration that was configured for each of the plurality of first hardware type components that were provided in the first subset of the plurality of computing devices, and 2) the respective personality configuration that was configured for each of the plurality of second hardware type components that were provided in the second subset of the plurality of computing devices.

13. The method of claim 12, wherein the configuring each of the at least one of the plurality of first hardware type components that were provided in each of the first subset of the plurality of computing devices to operate according to the respective personality configuration for the respective one of the components that was identified in the respective one of the plurality of computing device orders for that computing device by configuring that first hardware type component with firmware, capabilities, and functionality identified in that personality configuration includes:

configuring each of the at least one of the plurality of first hardware type components that were provided in each of the first subset of the plurality of computing devices with the respective personality configuration for the respective one of the components that was identified in the respective one of the plurality of computing device orders for that computing device by configuring that first hardware type component with firmware, capabilities, and functionality identified in that personality configuration.

14. The method of claim 12, wherein the configuring each of the at least one of the plurality of first hardware type components that were provided in each of the first subset of the plurality of computing devices to operate according to the respective personality configuration for the respective one of the components that was identified in the respective one of the plurality of computing device orders for that computing device by configuring that first hardware type component with firmware, capabilities, and functionality identified in that personality configuration includes:

configuring each of the first subset of the plurality of computing devices to configure the first hardware type component provided in that computing device with the respective personality configuration for the respective one of the first subset of the plurality of components that was identified in the respective one of the plurality of computing device orders for that computing device by configuring that first hardware type component with firmware, capabilities, and functionality identified in that personality configuration.

15. The method of claim 14, wherein the configuring each of the of the first subset of the plurality of computing devices to configure the first hardware type component provided in that computing device with the respective personality configuration for the respective one of the first subset of the plurality of components that was identified in the respective one of the plurality of computing device orders for that computing device by configuring that first hardware type component with firmware, capabilities, and functionality identified in that personality configuration includes:

configuring each of the first subset of the plurality of computing devices to determine that an operating system has been configured on that computing device and, in response, configure the first hardware type component provided in that computing device with the respective personality configuration for the respective one of the first subset of the plurality of components that was identified in the respective one of the plurality of computing device orders for that computing device by configuring that first hardware type component with firmware, capabilities, and functionality identified in that personality configuration.

16. The method of claim 12, wherein the first hardware type components are storage devices.

17. The method of claim 16, wherein each respective personality configuration defines endurance capabilities and security functionality for the storage device for which that respective personality configuration was provided.

<p style="text-align:center">*   *   *   *   *</p>